(12) United States Patent
Hayashi

(10) Patent No.: US 11,404,950 B2
(45) Date of Patent: Aug. 2, 2022

(54) RETARDER-EQUIPPED ROTATING ELECTRICAL MACHINE

(71) Applicant: TOYOTA JIDOSHA KABUSHIKI KAISHA, Toyota (JP)

(72) Inventor: Kenichiro Hayashi, Ohbu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/218,495

(22) Filed: Mar. 31, 2021

(65) Prior Publication Data

US 2021/0313868 A1 Oct. 7, 2021

(30) Foreign Application Priority Data

Apr. 6, 2020 (JP) .............................. JP2020-068423

(51) Int. Cl.
*H02K 49/10* (2006.01)
*H02K 16/00* (2006.01)
*H02K 49/00* (2006.01)
*H02K 16/02* (2006.01)
*H02K 47/00* (2006.01)

(52) U.S. Cl.
CPC ........... *H02K 49/102* (2013.01); *H02K 16/00* (2013.01); *H02K 16/02* (2013.01); *H02K 49/00* (2013.01); *H02K 16/025* (2013.01); *H02K 47/00* (2013.01); *H02K 49/106* (2013.01)

(58) Field of Classification Search
CPC ...... H02K 16/00; H02K 16/02; H02K 16/025; H02K 47/00; H02K 49/00; H02K 49/10; H02K 49/102; H02K 49/106

USPC ........ 310/103, 105, 106, 111, 112, 113, 114, 310/152, 154.06, 154.33, 156.01
See application file for complete search history.

(56) References Cited

U.S. PATENT DOCUMENTS 2,864,016 A * 12/1958 Waltscheff ............. H02K 51/00
310/211
5,675,203 A * 10/1997 Schulze .................... B60K 6/26
903/906

(Continued)

FOREIGN PATENT DOCUMENTS

| JP | 11-308898 A | 11/1999 |
| JP | 2005-176591 A | 6/2005 |
| JP | 2018-023212 A | 2/2018 |

*Primary Examiner* — Rashad H Johnson
(74) *Attorney, Agent, or Firm* — Oblon, McClelland, Maier & Neustadt, L.L.P.

(57) ABSTRACT

A retarder-equipped rotating electrical machine includes a rotor, a stator, and a retarder rotor. The stator has teeth at regular intervals in a circumferential direction. One ends of the teeth are disposed to face the rotor. The retarder rotor has a magnetic member continuously in the circumferential direction. The retarder rotor is disposed to face the other ends of the teeth of the stator and configured to rotate integrally with the rotor. A rotor-to-stator pole piece portion having pole pieces at regular intervals in the circumferential direction is disposed between the rotor and the stator. A stator-to-retarder rotor pole piece portion having pole pieces at regular intervals in the circumferential direction is disposed between the stator and the retarder rotor. Both pole piece portions are moved in the circumferential direction to switch between an operation as a motor or generator and an operation as a retarder.

3 Claims, 11 Drawing Sheets

(56) References Cited

U.S. PATENT DOCUMENTS

| | | | | |
|---|---|---|---|---|
| 5,917,248 | A * | 6/1999 | Seguchi | B60K 6/26 903/952 |
| 6,257,027 | B1 * | 7/2001 | Imai | D06F 37/304 68/12.14 |
| 6,380,653 | B1 * | 4/2002 | Seguchi | H02K 51/00 903/906 |
| 6,590,312 | B1 * | 7/2003 | Seguchi | B60K 6/40 310/156.01 |
| 6,794,781 | B2 * | 9/2004 | Razzell | H02K 7/11 310/156.01 |
| 6,998,757 | B2 * | 2/2006 | Seguchi | H02K 21/16 310/68 B |
| 7,230,363 | B2 * | 6/2007 | Stout | H02K 19/38 310/112 |
| 7,400,077 | B2 * | 7/2008 | Caroon | H02K 16/00 310/233 |
| 7,439,644 | B2 * | 10/2008 | Kim | H02K 16/02 310/156.25 |
| 7,455,608 | B2 * | 11/2008 | Moeller | B60K 6/365 475/5 |
| 8,653,677 | B2 * | 2/2014 | West | B60L 50/16 310/114 |
| 8,796,895 | B2 * | 8/2014 | Choi | H02K 21/12 310/156.43 |
| 8,970,080 | B2 * | 3/2015 | Li | H02K 29/03 310/266 |
| 9,979,266 | B2 * | 5/2018 | Aoyama | H02K 16/02 |
| 10,038,353 | B2 * | 7/2018 | Kusase | H02K 15/125 |
| 10,323,350 | B2 * | 6/2019 | Kim | H02K 7/083 |
| 11,205,943 | B1 * | 12/2021 | Fu | H02K 1/148 |
| 11,295,883 | B2 * | 4/2022 | Li | B25J 19/0004 |
| 2003/0102764 | A1 * | 6/2003 | Kusase | H02K 1/27 310/67 R |
| 2004/0108781 | A1 * | 6/2004 | Razzell | H02K 51/00 310/112 |
| 2005/0077800 | A1 * | 4/2005 | Hoeijmakers | B60K 6/26 903/906 |
| 2006/0226722 | A1 * | 10/2006 | Kim | H02K 16/02 310/156.25 |
| 2009/0278415 | A1 * | 11/2009 | Park | H02K 21/12 310/156.08 |
| 2010/0139999 | A1 * | 6/2010 | Park | H02K 7/102 310/114 |
| 2012/0007453 | A1 * | 1/2012 | Leiber | H02K 16/02 310/43 |
| 2012/0119509 | A1 * | 5/2012 | West | B60L 50/16 60/624 |
| 2012/0286616 | A1 * | 11/2012 | Li | H02K 21/029 310/191 |
| 2013/0181562 | A1 * | 7/2013 | Gieras | H02K 16/02 310/114 |
| 2013/0221778 | A1 * | 8/2013 | Kusase | H02K 7/108 310/78 |
| 2015/0270754 | A1 * | 9/2015 | Kusase | H02K 15/125 310/59 |
| 2016/0376741 | A1 * | 12/2016 | Kim | H02K 7/003 310/90 |
| 2020/0144886 | A1 * | 5/2020 | Gu | H02K 5/128 |
| 2021/0031892 | A1 * | 2/2021 | Lin | H02K 49/102 |

* cited by examiner

RETARDER-EQUIPPED ROTATING ELECTRICAL MACHINE

CROSS-REFERENCE TO RELATED APPLICATION

This application claims priority to Japanese Patent Application No. 2020-068423 filed on Apr. 6, 2020, incorporated herein by reference in its entirety.

BACKGROUND

1. Technical Field

The present disclosure relates to a rotating electrical machine usable as a retarder.

2. Description of Related Art

A retarder is an auxiliary brake mounted on a vehicle or the like to assist a main brake. For example, trucks and buses that are electrically-powered vehicles may be equipped with retarders to generate a retarding force on a downhill even when regenerative charging of a battery cannot be performed because of the full SOC of the battery. Retarders include a plurality of types. Not only a fluid retarder, a permanent magnet retarder, and the like but also an electromagnetic retarder is used.

Japanese Unexamined Patent Application Publication No. 11-308898 (JP 11-308898 A) describes that, when an alternator is short of electric power, an electromagnetic retarder is used as a generator. In the retarder, a stator is provided around a rotor fixed to a shaft, and a retarder rotor is provided around the stator. An exciter armature coil is wound on the rotor side of the stator, and a field coil is wound on the retarder rotor side of the stator. When an alternating-current voltage generated in the exciter armature coil is passed through the field coil, the electromagnetic retarder functions as a retarder. When the alternating-current voltage is taken out to the outside, the electromagnetic retarder functions as a generator.

SUMMARY

In the retarder described in JP 11-308898 A, the coils are respectively provided on the inner periphery and outer periphery of the stator, so the size of the body increases.

The present disclosure is intended to reduce the size of a retarder-equipped rotating electrical machine.

A retarder-equipped rotating electrical machine according to an aspect of the present disclosure includes: a rotor having magnetic poles at regular intervals in a circumferential direction and configured to rotate in the circumferential direction; a stator having teeth on which a coil is wound, the stator having the teeth at regular intervals in the circumferential direction, one ends of the teeth being disposed so as to face the rotor; a retarder rotor having a magnetic member continuously in the circumferential direction, the magnetic member being disposed so as to face the other ends of the teeth of the stator, the retarder rotor being configured to rotate integrally with the rotor; a rotor-to-stator pole piece portion having pole pieces at regular intervals in the circumferential direction and disposed between the rotor and the stator; a stator-to-retarder rotor pole piece portion having pole pieces at regular intervals in the circumferential direction and disposed between the stator and the retarder rotor; and a movement mechanism configured to control a flow of magnetic flux in and out of the teeth by moving the rotor-to-stator pole piece portion and the stator-to-retarder rotor pole piece portion, the movement mechanism being configured to change the rotor-to-stator pole piece portion and the stator-to-retarder rotor pole piece portion between a first position for a motor or a generator to cause an interaction due to the magnetic flux between the stator and the rotor and a second position for a retarder to cause an interaction due to the magnetic flux between the stator and the retarder rotor.

In the aspect of the present disclosure, the retarder-equipped rotating electrical machine may be connected to a drive shaft of a vehicle, the movement mechanism may be configured to, when a vehicle speed of the vehicle is less than a set vehicle speed value, place the rotor-to-stator pole piece portion and the stator-to-retarder rotor pole piece portion in the first position, and the movement mechanism may be configured to, when the vehicle speed of the vehicle is greater than or equal to the set vehicle speed value, place the rotor-to-stator pole piece portion and the stator-to-retarder rotor pole piece portion in the second position.

In the aspect of the present disclosure, the retarder-equipped rotating electrical machine may be connected to a battery configured to perform power supply and regenerative charging with the retarder-equipped rotating electrical machine, the movement mechanism may be configured to, when an SOC of the battery is less than a set SOC value, place the rotor-to-stator pole piece portion and the stator-to-retarder rotor pole piece portion in the first position, and the movement mechanism may be configured to, when the SOC of the battery is greater than or equal to the set SOC value, place the rotor-to-stator pole piece portion and the stator-to-retarder rotor pole piece portion in the second position.

According to the aspect of the present disclosure, a common stator may be used for a rotor and a retarder rotor, so no coil for the retarder rotor is required, with the result that a retarder-equipped rotating electrical machine with a reduced body size is achieved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

(1) Configuration

Figure 1:
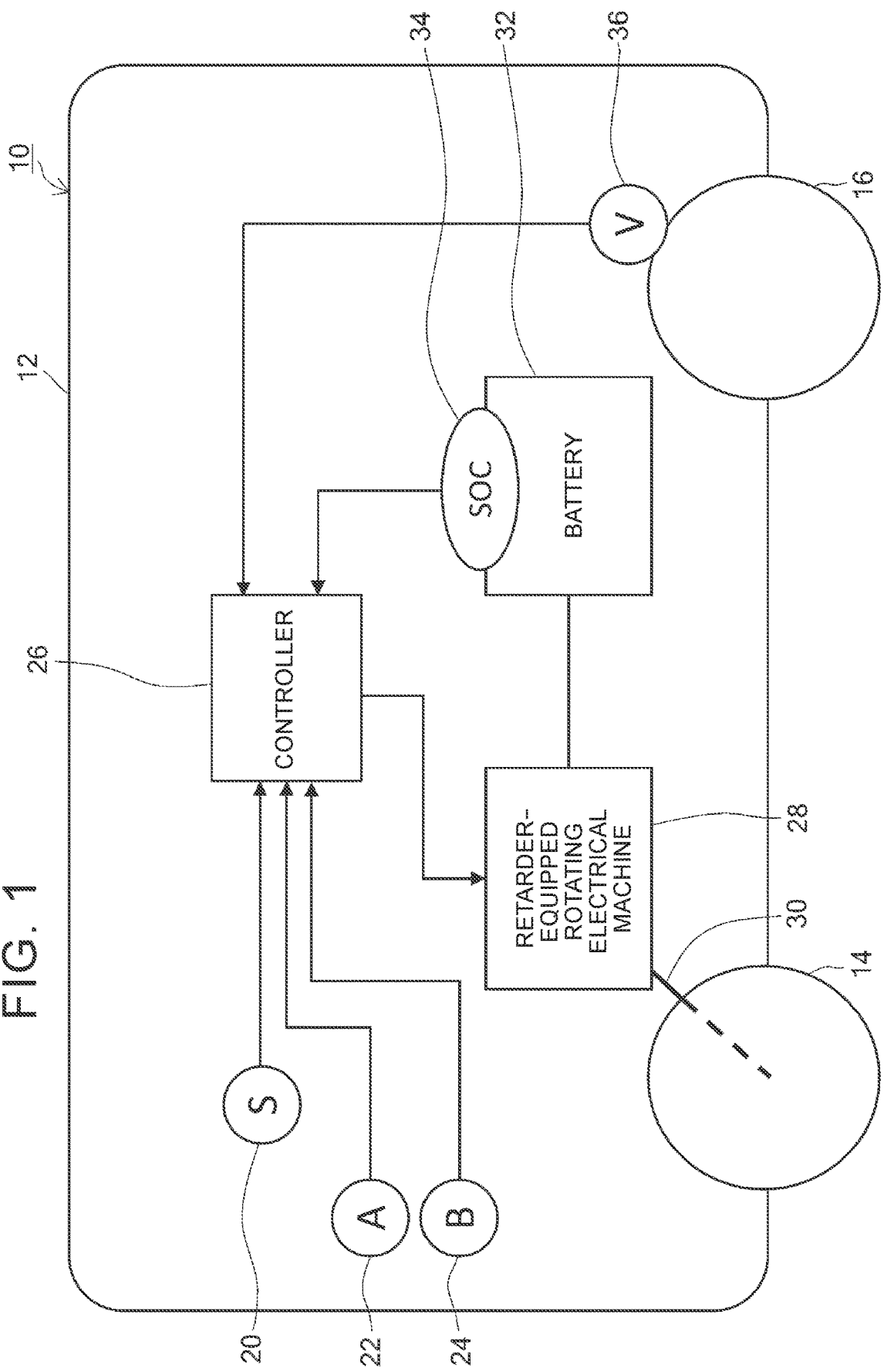
FIG. 1 is a diagram showing the schematic configuration of a vehicle according to an embodiment.

FIG. 1 is a diagram illustrating the configuration of a vehicle 10 according to an embodiment. In FIG. 1, the vehicle 10 is assumed as a bus and is an electrically-powered vehicle. Here, the electrically-powered vehicle is a vehicle driven by a motor. The electrically-powered vehicle also includes a hybrid vehicle driven by an internal combustion engine in addition to a motor. The vehicle 10 includes a body 12, front wheels 14, and rear wheels 16. The vehicle 10 includes a shift lever 20, an accelerator pedal 22, a brake pedal 24, a controller 26, a retarder-equipped rotating electrical machine 28, a drive shaft 30, a battery 32, an SOC sensor 34, and a speed sensor 36.

The shift lever 20, the accelerator pedal 22, and the brake pedal 24 are operating devices provided for driving operation of a driver of the vehicle 10. The shift lever 20 is provided to select the running mode of the vehicle. The shift lever 20 is configured to be enabled to select, for example, forward travel, reverse travel, parking, or the like. The shift lever 20 may be enabled to select whether to use normally used gear (so-called drive) or use low gear (which provides a high torque but is not appropriate for high-speed running) in forward travel. For example, the shift lever 20 may be enabled to select whether to actively perform regenerative charging.

The accelerator pedal 22 is an operating device that is depressed by a driver to control the driving force of the vehicle 10 and also the speed of the vehicle. When the accelerator pedal 22 is not depressed, the vehicle 10 does not receive a driving force or receives a slight driving force to move at a very low speed (so-called creep running). When the accelerator pedal 22 is depressed, the vehicle 10 increases the driving force according to a depression amount to accelerate.

The brake pedal 24 is an operating device that is depressed by a driver to decelerate the vehicle 10. When the brake pedal 24 is depressed, the vehicle 10 is decelerated mainly by the main brake (not shown). The main brake is, for example, configured to press a brake pad by using hydraulic pressure or air pressure against a disk or drum provided in each of the front wheels 14 or each of the rear wheels 16. Thus, a frictional force is applied, and the vehicle 10 decelerates. When the brake pedal 24 is depressed, the vehicle 10 decelerates according to a depression amount. When the brake pedal 24 is not depressed, the main brake does not operate.

Generally, when the main brake is applied with a high frictional force for an extended period of time, the brake pad and the disk or drum produce heat to reduce brake performance. For this reason, the vehicle 10 is decelerated in an auxiliary manner by using the retarder-equipped rotating electrical machine 28.

The controller 26 is a device that operates by controlling computer hardware including a processor and memory with software, such as an operating system (OS) and an application program. The controller 26 may be implemented by using, for example, one or more electronic control units (ECUs) mounted on the vehicle 10. The controller 26 controls various elements, such as running, lighting, and air-conditioning of the vehicle 10. In the specification, portions closely related to the embodiment will be mainly described.

Operating signals from the shift lever 20, the accelerator pedal 22, and the brake pedal 24 are input to the controller 26. Detection signals from the SOC sensor 34 and the speed sensor 36 are input to the controller 26. The controller 26 controls the retarder-equipped rotating electrical machine 28 based on these signals. The details of control will be described later.

The retarder-equipped rotating electrical machine 28 is a rotating electrical machine capable of driving the vehicle 10 and has the function of a retarder. One or more retarder-equipped rotating electrical machines 28 are mounted on the vehicle 10. In addition, one or more vehicle drive rotating electrical machines without the function of a retarder may be provided for the vehicle 10. The retarder-equipped rotating electrical machine 28 includes a rotary shaft. The shaft is connected to the drive shaft 30 of the vehicle 10. The retarder-equipped rotating electrical machine 28 operates under control of the controller 26.

Here, terms will be described. In the vehicle 10, a retarder means an auxiliary brake mounted to assist the main brake of the vehicle 10. However, the retarder-equipped rotating electrical machine 28 is also usable in a device other than the vehicle 10. In this case, a retarder may be used as a main brake and may be not used as an auxiliary brake. A rotating electrical machine is a device having the function of one or both of a motor and a generator. In the embodiment, the retarder-equipped rotating electrical machine 28 is capable of operating as three types of devices, that is, a retarder, a motor, and a generator, as will be described later.

The drive shaft 30 is a shaft that transmits torque to accelerate or decelerate the rotation of the front wheels 14 or rear wheels 16 of the vehicle 10. The drive shaft 30 is connected to the shaft of the retarder-equipped rotating electrical machine 28 directly or via a gear.

The battery 32 is a device that supplies an electric power to the retarder-equipped rotating electrical machine 28. The battery 32 is not only charged via an external power supply but also charged with regenerative electric power from the retarder-equipped rotating electrical machine 28.

The SOC sensor 34 is a sensor that detects the SOC (which is an abbreviation of state of charge and means a charging status) of the battery 32. The battery 32 is determined to be fully charged when the SOC exceeds a set upper limit and is determined to be empty when the SOC is lower than a set lower limit. A detection signal of the SOC sensor 34 is transmitted to the controller 26.

The speed sensor 36 is a sensor that measures the speed of the vehicle 10. A detection signal of the speed sensor 36 is transmitted to the controller 26.

In the above description, it is assumed that the vehicle 10 is operated by a driver in the vehicle 10. Alternatively, the vehicle 10 may be operated by a driver at a remote location. The vehicle 10 may have an autonomous driving mode in which a driver does not operate the vehicle 10 and a computer operates the vehicle 10. In the autonomous driving mode, instead of operating signals from the shift lever 20, the accelerator pedal 22, and the brake pedal 24, a computer that makes a decision as to autonomous driving transmits similar operating signals to the controller 26.

Figure 2:
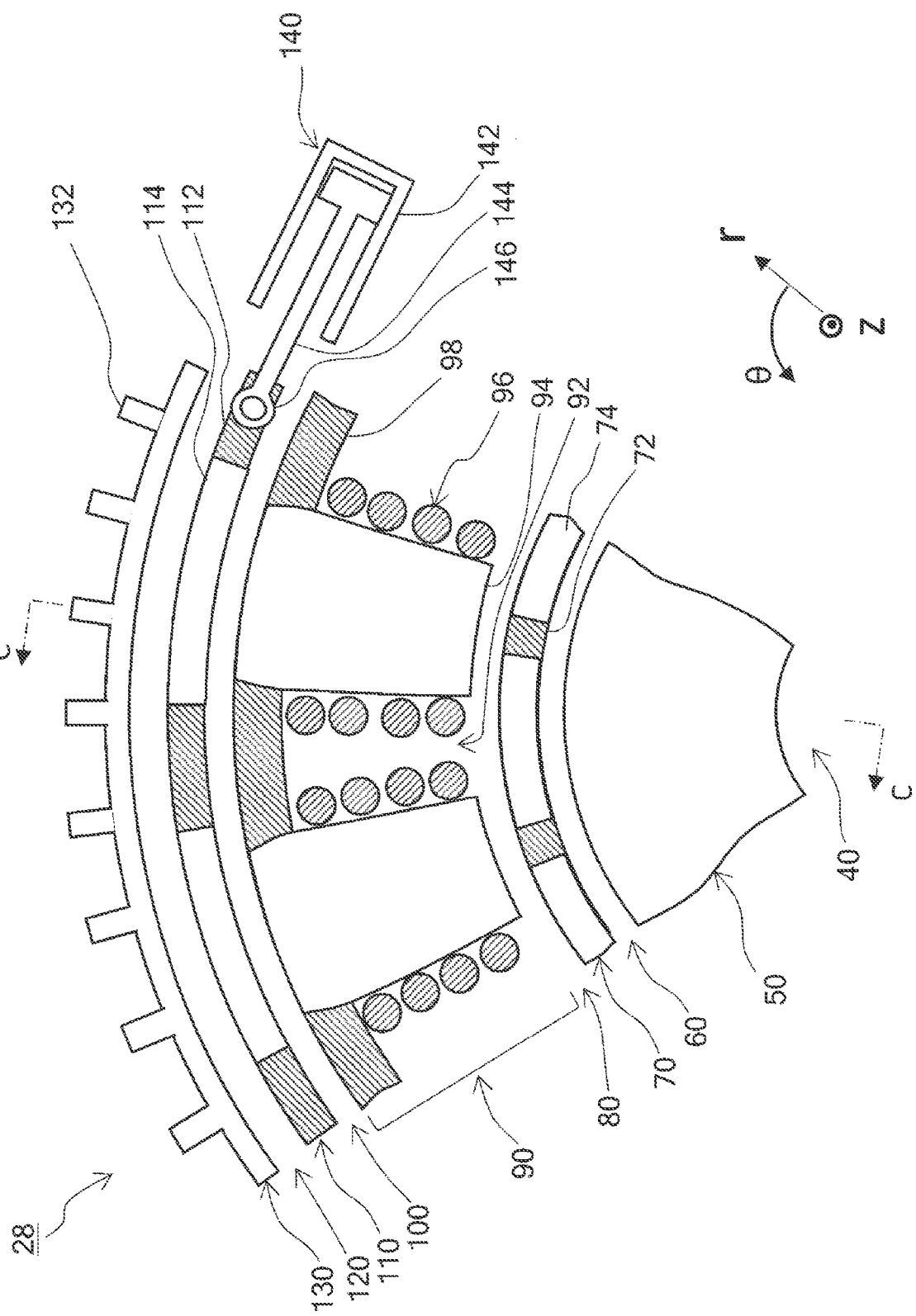
FIG. 2 is an end view of a retarder-equipped rotating electrical machine, taken along a plane perpendicular to a rotation axis.
Figure 3:
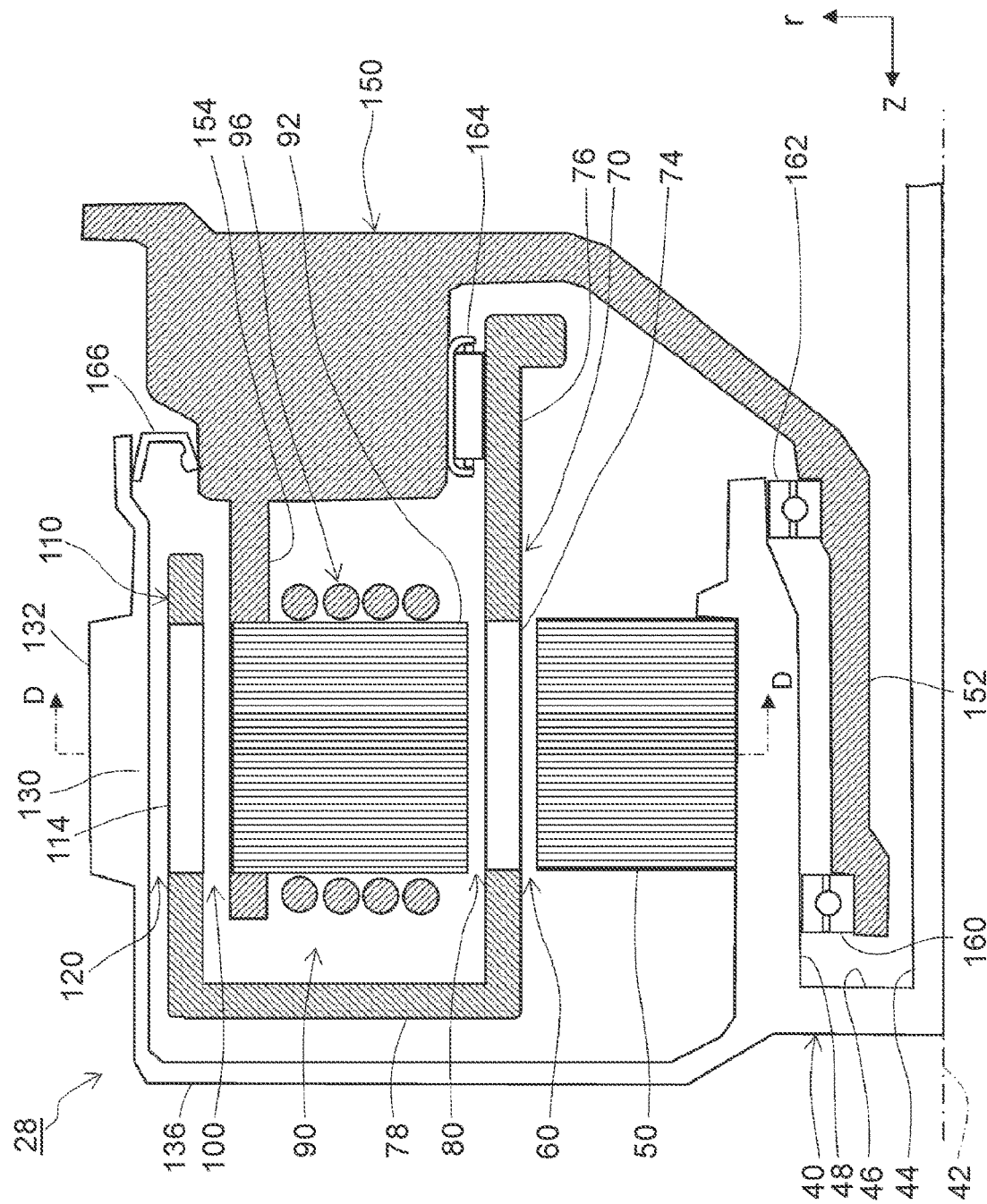
FIG. 3 is an end view of the retarder-equipped rotating electrical machine, taken along a plane along the rotation axis.

Next, the structure of the retarder-equipped rotating electrical machine 28 will be described with reference to FIG. 2 and FIG. 3. FIG. 2 is an end view of the retarder-equipped rotating electrical machine 28, taken along a plane perpendicular to a rotation axis. However, only part of the end view in a circumferential direction is shown. FIG. 3 is an end view of the retarder-equipped rotating electrical machine 28, taken along a plane including the rotation axis. However, one of sides across the rotation axis is not shown. FIG. 2 is a view taken along the line D-D in FIG. 3. FIG. 3 is a view taken along the line C-C in FIG. 2.

FIG. 2 and FIG. 3 show (r, θ, z) cylindrical coordinate systems. Here, an r coordinate direction indicates a direction from the rotation axis in an outward direction perpendicular to the rotation axis, a θ coordinate direction indicates a rotation direction, and a z coordinate direction indicates a direction of the rotation axis (the same applies to the following drawings). In the present embodiment, a positive side in the r coordinate direction may be referred to as outward, outer side, or the like. A negative side in the r coordinate direction may be referred to as inward, inner side, or the like. It is also noted that the positive and negative sides of the θ coordinate direction may be referred to as circumferential direction without specifically distinguishing the positive and negative sides from each other and rotation can be performed to both positive and negative sides in the θ coordinate direction.

The retarder-equipped rotating electrical machine 28 includes a shaft 40, a rotor 50, a rotor-to-stator pole piece portion 70, a stator 90, a stator-to-retarder rotor pole piece portion 110, a retarder rotor 130, a movement mechanism 140, and a case 150.

The shaft 40 is a member that extends along the rotation axis 42. As shown in FIG. 3, the shaft 40 is made up of a core member 44 located near the rotation axis and a cylindrical member 48 disposed so as to surround the core member 44. The core member 44 and the cylindrical member 48 are coupled via a connecting portion 46. The shaft 40 is formed to be rotatable and is coupled to the drive shaft 30 of the vehicle 10 at the negative side in the z coordinate direction such that torque can be transmitted.

The rotor 50 is a cylindrical component that is coupled to the shaft 40 and that rotates integrally with the shaft 40. In the embodiment, it is assumed that the rotor 50 includes a rotor core formed by stacking a large number of thin magnetic steel sheets, and permanent magnets inserted in magnet holes of the rotor core. The permanent magnets are installed such that magnetic poles are formed at regular intervals in the circumferential direction.

The rotor-to-stator pole piece portion 70 is a component provided on the outer side of the rotor 50 across a gap 60. The rotor-to-stator pole piece portion 70 is formed in a cylindrical shape so as to surround the outer surface of the rotor 50 in the r coordinate direction and is disposed coaxially with the rotation axis 42. In the rotor-to-stator pole piece portion 70, a connecting portion 72 made of a low magnetic permeability material and a pole piece 74 made of a high magnetic permeability magnetic material each are disposed at regular intervals in the circumferential direction. In the embodiment, it is assumed that the connecting portions 72 are made of aluminum and the pole pieces 74 are formed from the stacked magnetic steel sheets. When, for example, aluminum is poured into a mold in which a plurality of the pole pieces 74 is set, the rotor-to-stator pole piece portion 70 is formed. As shown in FIG. 3, one end side (negative side) of the rotor-to-stator pole piece portion 70 in the z coordinate direction is a leg portion 76 made of aluminum and is supported by the case 150 via a bearing 164. The other end side (positive side) of the rotor-to-stator pole piece portion 70 in the z coordinate direction is a bridge connecting portion 78 made of aluminum and is connected to the stator-to-retarder rotor pole piece portion 110.

The stator 90 is a component provided on the outer side of the rotor-to-stator pole piece portion 70 across a gap 80. The stator 90 is formed in a cylindrical shape so as to surround the outer surface of the rotor-to-stator pole piece portion 70 in the r coordinate direction and is disposed coaxially with the rotation axis 42. The stator 90 includes slots 92, teeth 94, a coil 96, and connecting portions 98. Of these, the teeth 94 and the connecting portions 98 are portions that make up the framework of the stator 90 and may be referred to as stator core. The teeth 94 are made of a high magnetic permeability magnetic material, and, in the embodiment, it is assumed that the teeth 94 are formed by stacking magnetic steel sheets. On the other hand, the connecting portions 98 are made of a low magnetic permeability material and, in the embodiment, it is assumed that the connecting portions 98 are made of aluminum. The stator core can also be molded by setting the teeth 94 in a mold and pouring aluminum into the mold.

The teeth 94 are disposed at regular intervals in the circumferential direction and extend in the r coordinate direction from the inner periphery (the surface facing the rotor 50) to the outer periphery (the surface facing the retarder rotor 130). On the inner periphery side of the stator 90, a groove called slot 92 is provided between any adjacent teeth 94. The coil 96 is wound around the teeth 94 by using the space of the slots 92. On the outer periphery side of the stator 90, the connecting portion 98 is provided between any adjacent teeth 94. With this structure, within the stator 90, a magnetic flux substantially does not flow (a magnetic flux is substantially magnetically insulated) between any adjacent teeth 94.

The stator-to-retarder rotor pole piece portion 110 is provided on the outer side of the stator 90 across a gap 100. The stator-to-retarder rotor pole piece portion 110 is formed in a cylindrical shape so as to surround the outer surface of the stator 90 in the r coordinate direction and is disposed coaxially with the rotation axis 42. In the stator-to-retarder rotor pole piece portion 110, a connecting portion 112 made of a low magnetic permeability material and a pole piece 114 made of a high magnetic permeability magnetic material each are disposed at regular intervals in the circumferential direction. In the embodiment, it is assumed that the connecting portions 112 are made of aluminum and the pole pieces 114 are formed from the stacked magnetic steel sheets, and can be manufactured as in the case of the rotor-to-stator pole piece portion 70. As described above, the stator-to-retarder rotor pole piece portion 110 is connected to the rotor-to-stator pole piece portion 70 by the bridge connecting portion 78.

The retarder rotor 130 is a component provided on the outer side of the stator-to-retarder rotor pole piece portion 110 across a gap 120. The retarder rotor 130 is formed in a cylindrical shape so as to surround the outer surface of the stator-to-retarder rotor pole piece portion 110 in the r coordinate direction and is disposed coaxially with the rotation axis 42. The retarder rotor 130 is a component in which a high magnetic permeability, electrically conductive magnetic material is provided continuously over the circumferential direction. In the embodiment, it is assumed that the retarder rotor 130 is made of iron. When a magnetic flux flows through iron, a large eddy current is induced, and Joule heat is generated due to electrical resistance. Fins 132 that are protruding portions that efficiently radiate heat are provided on the outer periphery of the retarder rotor 130. The retarder rotor 130 is connected to the shaft 40 by the bridge connecting portion 136. Therefore, the retarder rotor 130 integrally rotates with the shaft 40 and the rotor 50.

The movement mechanism 140 is a component provided for the stator-to-retarder rotor pole piece portion 110. The movement mechanism 140 includes a cylinder 142 and a piston 144. The cylinder 142 is fixed to the case 150 or the like. The piston 144 is placed in the cylinder 142 and is able to reciprocate in a direction along the axial direction of the cylinder. The piston 144 is moved by an actuator (not shown) (for example, an electromagnet, a compact motor, an air pressure, or the like) and is fixed at a destination location. A distal end portion 146 of the piston 144 is connected to one of the connecting portions 112 of the stator-to-retarder rotor pole piece portion 110. Thus, the movement mechanism 140 is able to move the stator-to-retarder rotor pole piece portion 110 slightly in the circumferential direction and fixes the stator-to-retarder rotor pole piece portion 110 at a moved location. At this time, the rotor-to-stator pole piece portion 70 connected by the connecting portion 78 also moves in the circumferential direction by the same rotation angle as the stator-to-retarder rotor pole piece portion 110 and is fixed.

The case 150 is a major member that makes up the outer surface of the retarder-equipped rotating electrical machine 28 and is fixed to the vehicle 10. In the retarder-equipped rotating electrical machine 28, it is noted that, other than the case 150, a component surrounding the outer surface may be provided. The case 150 is provided with an arm 152. The arm 152 extends into the shaft 40 and supports the cylindrical member 48 of the shaft 40 via bearings 160, 162 such that the cylindrical member 48 of the shaft 40 is rotatable. Thus, the shaft 40 is able to rotate around the rotation axis 42 in a predetermined position in the case 150. The case 150 also supports the leg portion 76 of the rotor-to-stator pole piece portion 70 via the bearing 164 such that the leg portion 76 of the rotor-to-stator pole piece portion 70 is rotatable. Therefore, the rotor-to-stator pole piece portion 70 and the stator-to-retarder rotor pole piece portion 110 are able to move around the rotation axis 42 in a predetermined position in the case 150.

The case 150 fixes the stator 90 via a support member 154. An oil seal 166 is provided between the case 150 and the retarder rotor 130. The oil seal 166 prevents a flow of oil cooling the stator 90, the rotor 50, and the like to the outside.

(2) Operation as Retarder

Figure 4:
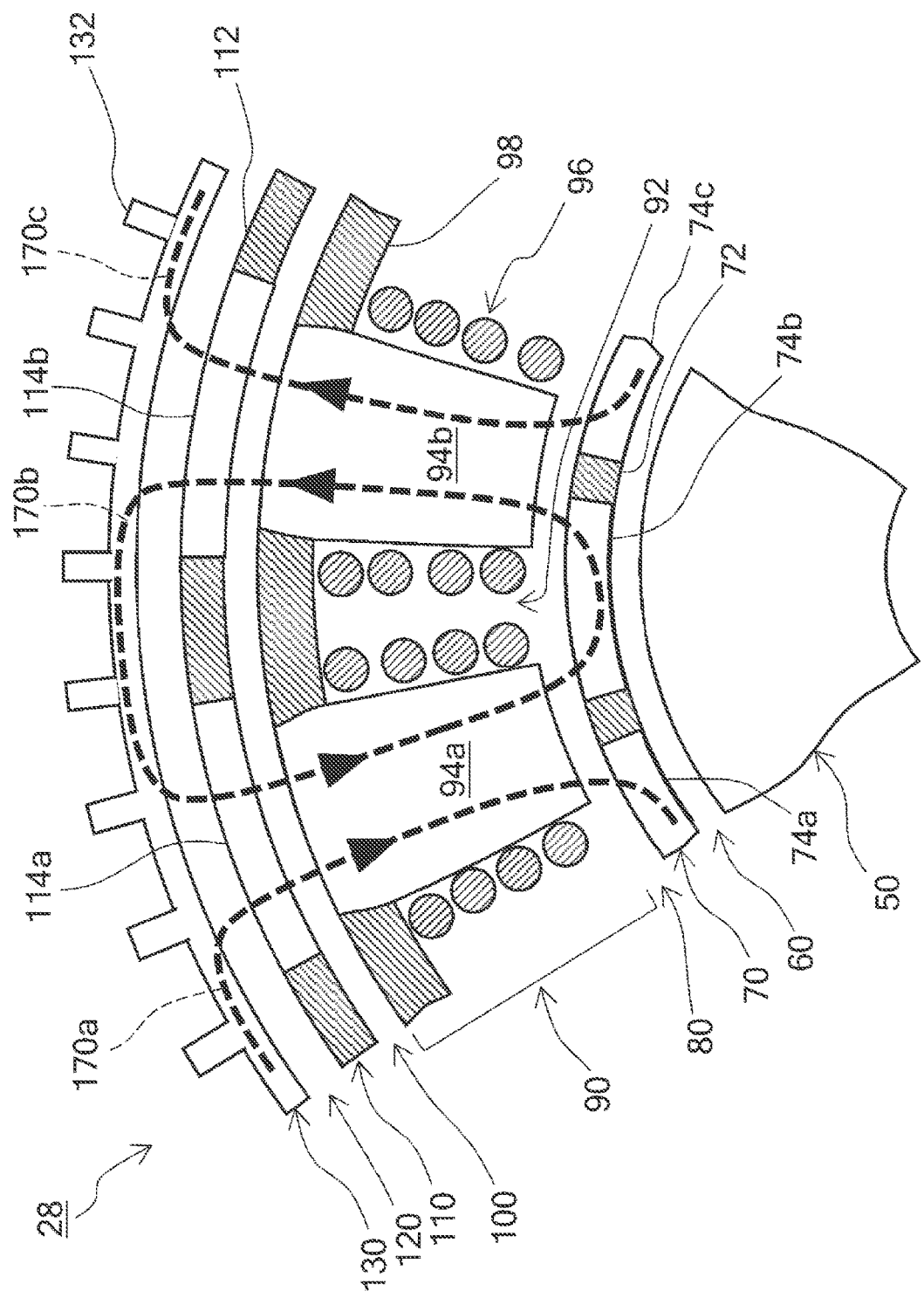
FIG. 4 is a view schematically showing a flow of magnetic flux in the case of an operation of a retarder.
Figure 5:
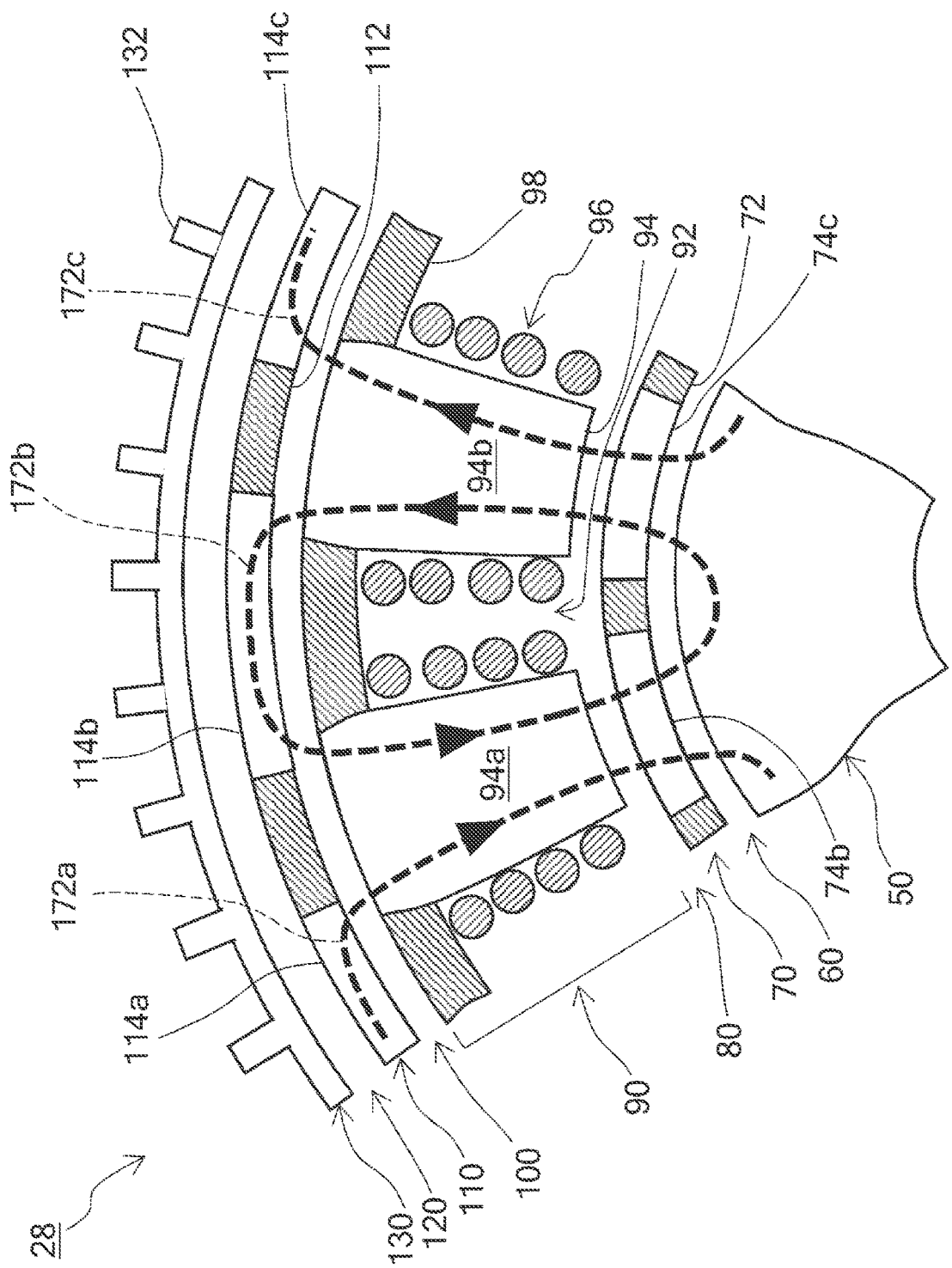
FIG. 5 is a view schematically showing a flow of magnetic flux in the case of an operation of a motor or a generator.

Next, the operation of the retarder-equipped rotating electrical machine 28 will be described with reference to FIG. 4 and FIG. 5. FIG. 4 and FIG. 5 are views showing a state where, in the retarder-equipped rotating electrical machine 28 shown in FIG. 2, the rotor-to-stator pole piece portion 70 and the stator-to-retarder rotor pole piece portion 110 are moved by the movement mechanism 140 and placed in a predetermined position. In the specification, the position shown in FIG. 4 may be referred to as second position, and the position shown in FIG. 5 may be referred to as first position. In FIG. 4 and FIG. 5, adjacent two teeth 94 are referred to as teeth 94a, 94b, adjacent three pole pieces 74 of the rotor-to-stator pole piece portion 70 are referred to as pole pieces 74a, 74b, 74c, and adjacent three pole pieces 114 of the stator-to-retarder rotor pole piece portion 110 are referred to as pole pieces 114a, 114b, 114c.

FIG. 4 is a view showing a state where the retarder-equipped rotating electrical machine 28 operates as a retarder by the rotor-to-stator pole piece portion 70 and the stator-to-retarder rotor pole piece portion 110, placed in the second position. Specifically, in the second position, the center of each of the connecting portions 72 of the rotor-to-stator pole piece portion 70 in the circumferential direction is placed at the same position in the circumferential direction as the center of a corresponding one of the teeth 94 in the circumferential direction. In addition, the center of each of the pole pieces 74 in the circumferential direction is placed at the same position in the circumferential direction as the center of a corresponding one of the slots 92 in the circumferential direction. However, each pole piece 74 is longer in the circumferential direction than each connecting portion 72, so an end of each pole piece 74 in the circumferential direction extends across an end of one of the adjacent teeth 94 in the circumferential direction toward the center of the one of the adjacent teeth 94 in the circumferential direction. In other words, when viewed along the r coordinate direction, an area around an end of each pole piece 74 in the circumferential direction overlaps an area around an end of one of the adjacent teeth 94 in the circumferential direction. In the second position, the center of each of the connecting portions 112 of the stator-to-retarder rotor pole piece portion 110 in the circumferential direction is placed at the same position in the circumferential direction as the center of a corresponding one of the connecting portions 98 of the stator 90 in the circumferential direction, and the center of each of the pole pieces 114 in the circumferential direction is placed at the same position in the circumferential direction as the center of a corresponding one of the teeth 94 in the circumferential direction.

Although only part of the retarder-equipped rotating electrical machine 28 in the θ direction is shown in FIG. 4, the intervals at which the teeth 94 are disposed in the circumferential direction, the intervals at which the pole pieces 74 of the rotor-to-stator pole piece portion 70 are disposed in the circumferential direction, and the intervals at which pole pieces 114 of the stator-to-retarder rotor pole piece portion 110 are disposed in the circumferential direction are set to substantially the same intervals. Therefore, in portions not shown in the drawing, a magnetic flux flows as in the case of FIG. 4.

Here, a state where the shaft 40, the rotor 50, and the retarder rotor 130 rotate integrally is assumed. At this time, a current is being passed through the coil 96 because of an electric power supplied from the battery 32. A current may be a direct current or may be an alternating current.

In the example shown in FIG. 4, regardless of whether a current is a direct current or an alternating current, it is assumed that currents respectively passed through the coils 96 on the adjacent two teeth 94a, 94b flow in opposite directions (the phases are shifted by 180°). The wide dashed lines in FIG. 4 schematically represent flows of typical three magnetic fluxes 170a, 170b, 170c implemented in the second position. In the tooth 94a, the magnetic fluxes 170a, 170b flow from a positive-side end (retarder rotor 130-side end) toward a negative-side end (retarder rotor 130-side end) in the r coordinate direction. The magnetic flux 170a flows out from the negative-side end of the tooth 94a in the r coordinate direction to the gap 80 and flows into the facing pole piece 74a of the rotor-to-stator pole piece portion 70. The magnetic flux 170b flows into the pole piece 74b.

The magnetic flux 170b having flowed into the pole piece 74b flows through the pole piece 74b in the circumferential direction and then flows out from a positive-side surface in the r coordinate direction to the gap 80. In other words, the magnetic flux 170b is controlled so as not to flow toward the rotor 50. The magnetic flux 170b having flowed out to the gap 80 flows from the negative-side end of the tooth 94b in the r coordinate direction into the tooth 94b. Similarly, the magnetic flux 170c flows from the pole piece 74c into the tooth 94b.

In the tooth 94b, the magnetic fluxes 170b, 170c flow from a negative-side end in the r coordinate direction toward a positive-side end in the r coordinate direction. The directions of the magnetic fluxes 170b, 170c that flow through the tooth 94b are opposite from the directions of the magnetic fluxes 170a, 170b that flow through the adjacent tooth 94a. This is consistent with the fact that currents in opposite directions are passed through the coils 96 on the adjacent teeth 94a, 94b.

The magnetic fluxes 170b, 170c that flow out from the positive-side end of the tooth 94b in the r coordinate direction to the gap 100 flow into the facing pole piece 114b of the stator-to-retarder rotor pole piece portion 110. Then, the magnetic fluxes 170b, 170c flow through the pole piece 114b in the r coordinate direction and flow out from a positive-side surface in the r coordinate direction to the gap 120. The magnetic fluxes 170b, 170c having flowed out flow into the facing retarder rotor 130.

The magnetic flux 170b having flowed into the retarder rotor 130 from the negative-side surface in the r coordinate direction flows inside the retarder rotor 130 in the circumferential direction. Then, the magnetic flux 170b flows out from the negative-side of the retarder rotor 130 in the r coordinate direction to the gap 120, passes through the facing pole piece 114a of the stator-to-retarder rotor pole piece portion 110 and the gap 100, and flows from the positive-side end of the tooth 94a in the r coordinate direction into the tooth 94a. Similarly, the magnetic flux 170a also flows from the retarder rotor 130, passes through the pole piece 114a, and flows into the tooth 94a.

As described above, in the second position, a flow of the magnetic fluxes 170a, 170b, 170c caused by the coil 96 is controlled by the pole pieces 74 of the rotor-to-stator pole piece portion 70 and the pole pieces 114 of the stator-to-retarder rotor pole piece portion 110. Through the control, the magnetic fluxes 170a, 170b, 170c do not flow toward the rotor 50, and no electromagnetic interaction occurs between the stator 90 and the rotor 50. On the other hand, the magnetic fluxes 170a, 170b, 170c are passed through the retarder rotor 130, and an electromagnetic interaction occurs between the stator 90 and the retarder rotor 130.

As described above, the rotor-to-stator pole piece portion 70, the stator 90, and the stator-to-retarder rotor pole piece portion 110 are fixed to the case 150. On the other hand, the retarder rotor 130 is integrated with the shaft 40 and the rotor 50. Therefore, while the vehicle 10 is being driven, the retarder rotor 130 rotates in the circumferential direction at a rotation speed corresponding to a speed of the vehicle 10 together with the shaft 40 coupled to the drive shaft 30.

A temporal change in magnetic flux occurs in the retarder rotor 130 as a result of the rotation, so an induced current is generated. By the interaction between the induced current and the magnetic flux, the retarder rotor 130 receives Lorentz force in a direction opposite from the rotation direction. The Lorentz force acts as a braking force that stops the rotation of the retarder rotor 130, the shaft 40, and the rotor 50 and further acts to decelerate the vehicle 10 through the drive shaft 30. In addition, the stator 90 also receives a reaction force through a change in magnetic flux.

An induced current generated in the retarder rotor 130 flows through the retarder rotor 130 in a spiral form, so the induced current may be called eddy current. The eddy current heats the retarder rotor 130 as Joule heat because of the electrical resistance of the retarder rotor 130. The generated heat is efficiently radiated through the fins 132.

In the above-described example, currents passed through the coils 96 of the adjacent teeth 94 are in opposite directions. In this case, the magnitudes of magnetic fluxes (that is, the absolute values of magnetic fluxes) that flow through the teeth 94 are equal to each other. Actually, in FIG. 4 and FIG. 5, when the directions of magnetic fluxes are ignored, it is found that the magnetic fluxes are flowing through the teeth 94 in the same pattern. Therefore, the flow of magnetic flux does not vary among the teeth 94, and the flow of magnetic flux is homogeneously controlled all around. In addition, it is possible to sufficiently reduce a magnetic flux that leaks toward the rotor 50. When a disturbance in the flow of magnetic flux is allowed to some extent, currents passed through the coils 96 on the teeth 94 may be applied in other phases. For example, currents at a phase difference of 120° may be passed through the teeth 94 sequentially in the θ direction.

(3) Operation as Motor or Generator

FIG. 5 is a view showing a state where the retarder-equipped rotating electrical machine 28 operates as a motor or a generator by the rotor-to-stator pole piece portion 70 and the stator-to-retarder rotor pole piece portion 110, placed in the first position. In the first position, the rotor-to-stator pole piece portion 70 and the stator-to-retarder rotor pole piece portion 110 are placed by shifting, in the circumferential direction, half of the intervals at which the pole pieces 74 are disposed in the circumferential direction (which are the same as the intervals at which the teeth 94 are disposed in the circumferential direction and are also the same as the intervals at which the pole pieces 114 are disposed in the circumferential direction).

Specifically, in the first position, the center of each of the connecting portions 72 of the rotor-to-stator pole piece portion 70 in the circumferential direction is placed at the same position in the circumferential direction as the center of a corresponding one of the slots 92 in the circumferential direction, and the center of each of the pole pieces 74 in the circumferential direction is placed at the same position in the circumferential direction as the center of a corresponding one of the teeth 94 in the circumferential direction. In the first position, the center of each of the connecting portions 112 of the stator-to-retarder rotor pole piece portion 110 in the circumferential direction is placed at the same position in the circumferential direction as the center of a corresponding one of the teeth 94 in the circumferential direction, and the center of each of the pole pieces 114 in the circumferential direction is placed at the same position in the circumferential direction as the center of a corresponding one of the slots 92 in the circumferential direction. However, each pole piece 114 is longer than each connecting portion 112, so an end of each pole piece 114 in the circumferential direction extends across an end of one of the adjacent teeth 94 in the circumferential direction toward the center of the one of the adjacent teeth 94 in the circumferential direction. In other words, when viewed along the r coordinate direction, an area around an end of each pole piece 114 in the circumferential direction overlaps an area around an end of one of the adjacent teeth 94 in the circumferential direction.

Next, a flow of the magnetic fluxes 172a, 172b, 172c will be described. The magnetic fluxes 172a, 172b having flowed out to the gap 80 from the negative-side end of the tooth 94b in the r coordinate direction penetrate through the facing pole piece 74b of the rotor-to-stator pole piece portion 70, pass through the gap 60, and reach the rotor 50. Although, in the rotor 50, a flow of the magnetic fluxes 172a, 172b, 172c receives the influence of the magnetic pole of the rotor 50, FIG. 5 simply shows the flow of the magnetic fluxes 172a, 172b, 172c.

After that, the magnetic flux 172b flows out from the rotor 50 to the gap 60, penetrates through the pole piece 74 of the rotor-to-stator pole piece portion 70, and flows out to the gap 80. Furthermore, the magnetic flux 172b flows from the negative-side end of the tooth 94b in the r coordinate direction into the tooth 94b, penetrates through the tooth 94b, and flows out from the positive-side end in the r coordinate direction to the gap 100. Then, the magnetic flux 172b flows into the facing pole piece 114b of the stator-to-retarder rotor pole piece portion 110, flows through the pole piece 114b in the circumferential direction, and then flows out from the pole piece 114b to the gap 100. The magnetic flux 172b having flowed out to the gap 100 flows from the positive-side end of the facing tooth 94a in the r coordinate direction into the tooth 94a. This also applies to the other magnetic fluxes 172a, 172c.

As described above, in the first position, a flow of the magnetic fluxes 172a, 172b, 172c that flow through the teeth 94a, 94b is controlled by the pole pieces 74 of the rotor-to-stator pole piece portion 70 and the pole pieces 114 of the stator-to-retarder rotor pole piece portion 110. Through the control, the magnetic fluxes 172a, 172b, 172c are caused to flow toward the rotor 50. Therefore, between the stator 90 and the rotor 50, an electromagnetic interaction occurs as will be described below. On the other hand, the magnetic fluxes 172a, 172b, 172c are not passed through the retarder rotor 130. Therefore, the stator 90 and the retarder rotor 130 do not cause an electromagnetic interaction. In other words, in the first position, different from the second position, the retarder-equipped rotating electrical machine 28 does not operate as a retarder.

When the retarder-equipped rotating electrical machine 28 is caused to operate as a motor, a current controlled in accordance with the rotation angle of the magnetic pole of the rotor 50 is passed through the coil 96 wound on the teeth 94, and the magnetic fluxes 172a, 172b, 172c are formed. Then, the rotor 50 rotates by the interaction with a magnetic flux having flowed out toward the rotor 50.

In the example shown in FIG. 5, alternating currents different in phase of 180° are being passed through the adjacent teeth 94. With these currents, the magnetic fluxes 172a, 172b are flowing in the tooth 94a from the outer side toward the inner side, and the magnetic fluxes 172b, 172c are flowing in the adjacent tooth 94b from the inner side toward the outer side. This position relation, as in the case of the retarder, is suitable in homogeneously controlling a flow of magnetic flux all around. In addition, it is possible to sufficiently reduce a magnetic flux that leaks toward the retarder rotor 130. When less significance is placed on efficiency, it is possible to flow currents having other phases. For example, alternating currents at a phase difference of 120° may be passed through the teeth 94 sequentially in the θ direction.

In the first position, the retarder-equipped rotating electrical machine 28 may be operated as a generator. In this case, the magnetic fluxes 172a, 172b, 172c shown in FIG. 5 are the ones due to the magnetic pole of the rotor 50. When the magnetic fluxes 172a, 172b, 172c revolve with the rotor 50, an electromotive force corresponding to a temporal change in magnetic flux is generated in the coil 96 wound on the teeth 94, and a current flows through the coil 96. By passing the current to the battery 32, the battery 32 is charged through regeneration.

As described in the above (1), (2), and (3), in the retarder-equipped rotating electrical machine 28, the stator 90 including the teeth 94 and the coil 96 is shared between the rotor 50 and the retarder rotor 130. Therefore, the body size of the retarder-equipped rotating electrical machine 28 is reduced.

(4) Use in Vehicle

An example of use of the retarder-equipped rotating electrical machine 28 in the vehicle 10 will be described with reference to FIG. 6 and FIG. 7. When the retarder-equipped rotating electrical machine 28 operates as a retarder, it is possible to decelerate the vehicle 10 on a downhill or the like even when the SOC of the battery 32 of the vehicle 10 is full. On the other hand, when the retarder-equipped rotating electrical machine 28 is operated as a retarder in a state where the SOC of the battery 32 is low, electric power efficiency (which means the efficiency of electric power consumption) deteriorates because the battery 32 is not charged. Therefore, the controller 26 of the vehicle 10 executes control for achieving both ensuring braking and improving electric power efficiency.

Figure 6:
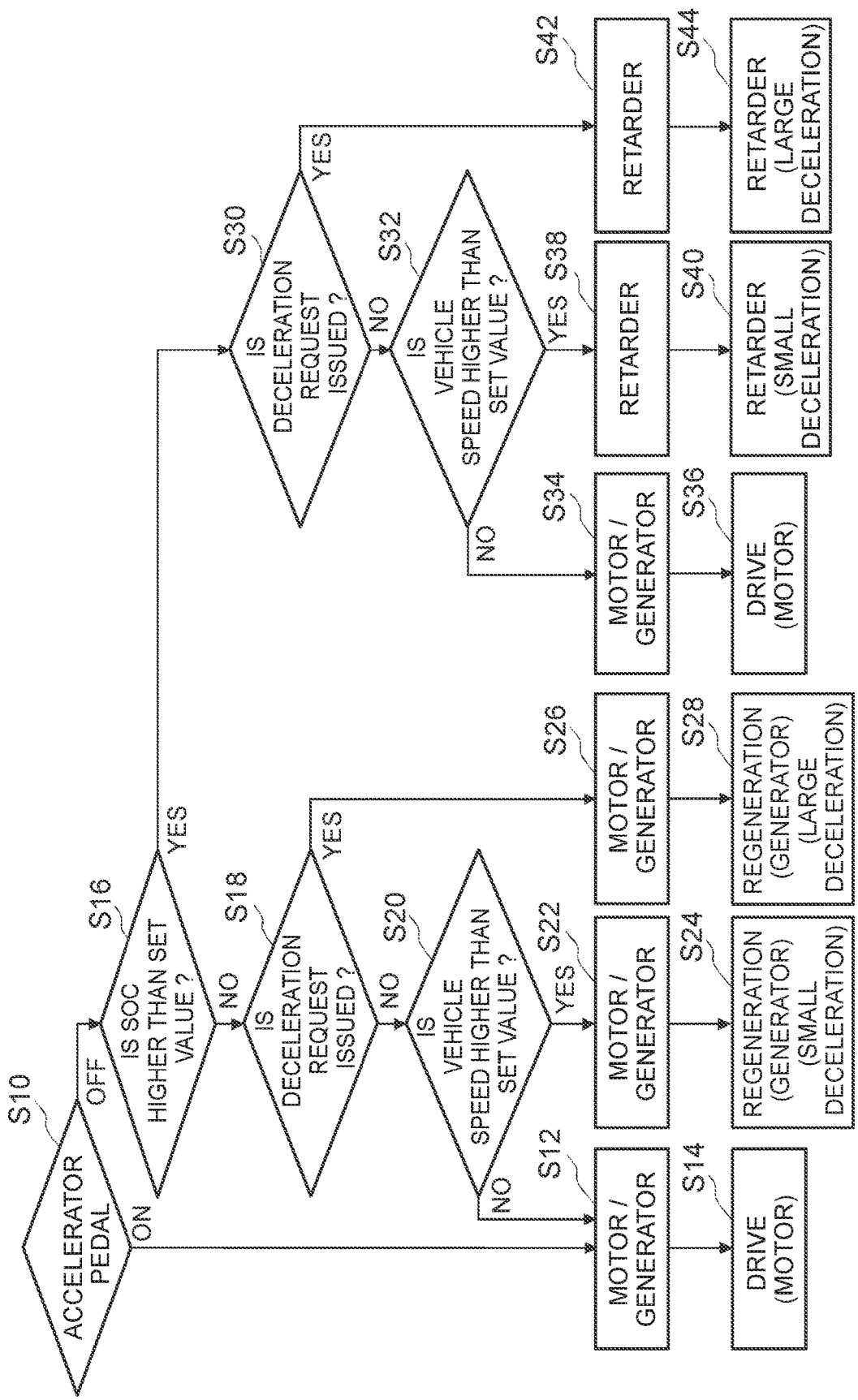
FIG. 6 is a flowchart showing an example of control over the retarder-equipped rotating electrical machine.

FIG. 6 is a flowchart showing one mode of control over the retarder-equipped rotating electrical machine 28. In this example, the controller 26 initially determines whether the accelerator pedal 22 of the vehicle 10 is depressed (on) or not depressed (off) (S10). When depressed, that is, when an operating signal indicating an acceleration request is received, the controller 26 controls the movement mechanism 140 to place the rotor-to-stator pole piece portion 70 and the stator-to-retarder rotor pole piece portion 110 in the first position for a motor and a generator (S12). When the rotor-to-stator pole piece portion 70 and the stator-to-retarder rotor pole piece portion 110 are already placed in the first position, the controller 26 maintains the first position. Then, the controller 26 causes the retarder-equipped rotating electrical machine 28 to operate as a motor with electric power supplied from the battery 32 to drive the vehicle 10 (S14).

When the accelerator pedal 22 is not depressed, the controller 26 determines whether the SOC of the battery 32 is higher than a set value (which is referred to as set SOC value) based on a measured value of the SOC sensor 34 (S16). The set SOC value is a value used to determine which whether to allow regenerative charging of the battery 32. The set SOC value may be, for example, a value at which the battery 32 is regarded as being fully charged during external charging. The set SOC value may also be, for example, set to a value slightly higher or lower than the value regarded as being fully charged. The set SOC value may be changed according to degradation of the battery 32, a current running environment (for example, a distance to a destination, a difference in height), or the like.

When the SOC is lower than the set SOC value (NO), the controller 26 determines whether a deceleration request is issued (S18). The deceleration request is an operating signal related to deceleration of the vehicle 10. The deceleration request is typically a request issued by depressing the brake pedal 24 or a request issued by changing the shift lever 20 from gear used in normal running to lower gear. A request to change into a driving mode in which regenerative charging is actively performed may be treated as the deceleration request because energy originally usable for running is sacrificed.

When no deceleration request is issued (NO), the controller 26 determines whether the vehicle speed is higher than a set value (which is referred to as set vehicle speed value A) (S20). The set vehicle speed value A is a value used to determine which what kind of speed control is executed is in a state where no acceleration request or deceleration request is issued. The set vehicle speed value A may be set to, for example, a speed used to determine whether to perform creep driving and may be set to about 5 km/h or about 10 km/h.

When the vehicle speed is lower than the set vehicle speed value A (NO), the process proceeds to step S12 and step S14. However, the accelerator pedal 22 is not depressed, so the acceleration in step S14 is a small value. For example, an acceleration may be applied to such an extent to maintain a speed against road surface friction, the mechanical friction of a drive-train, or the like.

When the vehicle speed is higher than the set vehicle speed value A (YES), the controller 26 places the rotor-to-stator pole piece portion 70 and the stator-to-retarder rotor pole piece portion 110 in the first position (S22) and then sets the retarder-equipped rotating electrical machine 28 to be used as a generator (S24). In other words, rotational energy transmitted from the drive shaft 30 of the vehicle 10 is converted to electrical energy in the retarder-equipped rotating electrical machine 28, and the battery 32 is charged through regeneration. However, regeneration is performed in a state where no deceleration request is issued, so the deceleration is set to a small value.

When a deceleration request is issued in step S18 (YES), the controller 26 places the rotor-to-stator pole piece portion 70 and the stator-to-retarder rotor pole piece portion 110 in the first position for a generator (S26) and then sets the retarder-equipped rotating electrical machine 28 to be used as a generator (S28). However, in step S28, different from step S24, regeneration is performed under a regeneration request, so the degree of regenerative charging is raised to increase the deceleration.

When the SOC is higher than the set SOC value in step S16 (YES), the controller 26 determines whether a deceleration request is issued (S30). When no deceleration request is issued (NO), the controller 26 determines whether the vehicle speed is higher than a set value (S32). When the set vehicle speed value A as that of step S20 is used as the set value here, it is possible to obtain a similar behavior of the vehicle 10 regardless of the degree of the SOC. However, in consideration of a difference between a generator and a retarder, a value different from the set vehicle speed value A in step S20 may be used.

When the vehicle speed is lower than or equal to the set vehicle speed value A in step S32 (NO), the controller 26 places the rotor-to-stator pole piece portion 70 and the stator-to-retarder rotor pole piece portion 110 in the first position for a motor (S34) and then supplies a small amount of electric power to the retarder-equipped rotating electrical machine 28 to be operated as a motor (S36).

On the other hand, when the vehicle speed is higher than the set vehicle speed value A in step S32 (YES), the retarder-equipped rotating electrical machine 28 is used as a retarder. In other words, the controller 26 controls the movement mechanism 140 to place the rotor-to-stator pole piece portion 70 and the stator-to-retarder rotor pole piece portion 110 in the second position for a retarder (S38). When the rotor-to-stator pole piece portion 70 and the stator-to-retarder rotor pole piece portion 110 are already placed in the second position, the controller 26 maintains the second position. Then, the controller 26 passes current through the coil 96 with electric power supplied from the battery 32 to decelerate the vehicle 10 (S40). However, in step S40, the vehicle 10 is decelerated in a state where no deceleration request is issued, so the deceleration is set to a small value as in the case of step S24.

When a deceleration request is issued in step S30 as well (YES), the controller 26 uses the retarder-equipped rotating electrical machine 28 as a retarder. In other words, the controller 26 places the rotor-to-stator pole piece portion 70 and the stator-to-retarder rotor pole piece portion 110 in the second position (S42) and passes a large current through the coil 96 to significantly decelerate the vehicle 10 (S44).

Processes from step S10 are repeatedly executed each time a new event occurs. The new event may be operation of the accelerator pedal 22, operation of the brake pedal 24, operation of the shift lever 20, or the like. For example, it is assumed to change from a state where the accelerator pedal 22 is not depressed (off) to a state where the accelerator pedal 22 is depressed (on).

When the SOC is lower than or equal to the set SOC value before the accelerator pedal 22 is depressed, any one of step S14, step S24, and step S28 is reached as a result of determination of step S16, and the retarder-equipped rotating electrical machine 28 is operated as a motor or a generator. When the accelerator pedal 22 is depressed in this state, after the determination of step S10, the process skips step S12 and proceeds to step S14. In other words, without changing from the second position for a retarder to the first position for a motor, the retarder-equipped rotating electrical machine 28 is able to directly operate as a motor to accelerate the vehicle 10. When a deceleration request is issued, deceleration as a generator is immediately performed, so it is possible to prevent coasting and improve electric power efficiency.

On the other hand, when the SOC is higher than the set SOC value, no deceleration request is issued, and the vehicle speed is lower than or equal to the set vehicle speed value A before the accelerator pedal 22 is depressed, the retarder-equipped rotating electrical machine 28 is in a motor driving state of step S36. When the accelerator pedal 22 is depressed in this state, after the determination of step S10, the process skips step S12 and proceeds to step S14. Therefore, for example, it is possible to accelerate the vehicle 10 with high response from a state where the vehicle 10 is performing creep running.

When the SOC is higher than the set SOC value, no deceleration request is issued, and the vehicle speed is higher than the set vehicle speed value A before the accelerator pedal 22 is depressed, the retarder-equipped rotating electrical machine 28 is in a state of step S40. In other words, the retarder-equipped rotating electrical machine 28 is operating as a retarder. When the accelerator pedal 22 is depressed in this case, after the determination of step S10, the rotor-to-stator pole piece portion 70 and the stator-to-retarder rotor pole piece portion 110 are changed from the second position for a retarder to the first position for a motor in step S12, and then acceleration is performed in step S14. In other words, there is a slight time lag before acceleration is performed. However, the vehicle 10 is running faster than the set vehicle speed value A and is able to continue running even during the changing operation, so influence vehicle driving is small.

Similarly, the case where the SOC is higher than the set SOC value, no deceleration request is issued, and the vehicle speed is higher than the set vehicle speed value A before the accelerator pedal 22 is depressed will be discussed. In this case, as described above, the retarder-equipped rotating electrical machine 28 is operating as a retarder (S38 and S40). In this state, when the brake pedal 24 is depressed, deceleration is performed by the retarder in accordance with the flow of step S10, step S16, step S30, step S42, and step S44. In the course of this process, the retarder-equipped rotating electrical machine 28 is already in a retarder state, so it is possible to prevent or suppress coasting and immediately perform deceleration. In other words, even in a situation in which the SOC is higher than the set value and deceleration cannot be performed by means of regenerative charging, the retarder quickly operates.

When the SOC is higher than the set SOC value and a deceleration request is issued before the accelerator pedal 22 is depressed, the retarder-equipped rotating electrical machine 28 is in the state of step S44 and is operating as a retarder, and significant deceleration is being performed. When the accelerator pedal 22 is depressed in this state, after the determination of step S10, the rotor-to-stator pole piece portion 70 and the stator-to-retarder rotor pole piece portion 110 are changed from the second position for a retarder to the first position for a motor in step S12, and then acceleration is performed in step S14. However, when significant deceleration is performed by using the retarder, it is estimated that deceleration is originally required, so, even when there is a slight time lag before acceleration is performed, influence on vehicle driving is small.

Different from the flow shown in FIG. 6, when the accelerator pedal 22 is off in S10, the process may proceed to the process of step S30 without performing a determination as to the SOC in step S16. In this case, when no deceleration request is issued (S30) and the vehicle speed is lower than or equal to the set value (S32), the controller 26 places the rotor-to-stator pole piece portion 70 and the stator-to-retarder rotor pole piece portion 110 in the first position for a motor (S34) and then supplies a small amount of electric power to the retarder-equipped rotating electrical machine 28 to be operated as a motor (S36). Therefore, when acceleration is performed from the low-speed state, the retarder-equipped rotating electrical machine 28 is already set as a motor in the flow of step S10, step S12, and step S14, so it is possible to immediately perform acceleration.

Next, another example of control will be described with reference to FIG. 7. In the example of FIG. 7, the controller 26 initially determines whether the vehicle speed is higher than the set value (which is also referred to as set vehicle speed value B) (S50). As will be described later, the set vehicle speed value B is a speed used to determine to shift into a retarder in a state where the battery 32 is, for example, fully charged, and is set to the same speed as a speed at which the vehicle 10 runs ordinarily or a speed slightly higher than that speed.

When the vehicle speed is lower than or equal to the set vehicle speed value B in step S50 (NO), the controller 26 places the rotor-to-stator pole piece portion 70 and the stator-to-retarder rotor pole piece portion 110 in the first position for a motor (S52) to be operated as a motor (S54). On the other hand, when the vehicle speed is higher than the set vehicle speed value B (YES), the controller 26 determines whether a deceleration request is issued (S56).

When no deceleration request is issued (NO), the controller 26 determines whether the SOC is higher than the set value (which is also referred to as set SOC value) (S58). When the SOC is lower than or equal to the set value (NO), it is possible to charge the battery 32 through regeneration. Then, the controller 26 places the rotor-to-stator pole piece portion 70 and the stator-to-retarder rotor pole piece portion 110 in the first position for a generator (S60) and then charges the battery 32 through regeneration (S62). However, in step S62, no deceleration request is issued, so the degree of regeneration is set to a small degree.

When the SOC is higher than the set SOC value in step S58 (YES), it is possible to charge the battery 32 through regeneration. Then, the controller 26 places the rotor-to-stator pole piece portion 70 and the stator-to-retarder rotor pole piece portion 110 in the second position to operate the retarder-equipped rotating electrical machine 28 as a retarder (S64). Then, the controller 26 passes a slight current through the coil 96 to cause the retarder-equipped rotating electrical machine 28 to perform slight deceleration (S66).

When a deceleration request is issued in step S56 (YES), the controller 26 determines whether the SOC is higher than the set SOC value (S68). The set SOC value is typically set to the same value as the set SOC value in step S58 and may be varied from the set SOC value in step S58.

When the SOC is lower than or equal to the set SOC value (NO), the controller 26 places the rotor-to-stator pole piece portion 70 and the stator-to-retarder rotor pole piece portion 110 in the first position for a generator (S70) and performs regenerative charging (S72). The regenerative charging is performed in a situation in which a deceleration request is issued, so significant deceleration is performed.

When the SOC is higher than the set SOC value (YES), the controller 26 places the rotor-to-stator pole piece portion 70 and the stator-to-retarder rotor pole piece portion 110 in the second position for a retarder (S74) and passes a large current through the coil 96 to perform significant deceleration by using the retarder (S76). The process from step S50 is repeatedly executed each time an event, such as operation of the accelerator pedal 22, operation of the brake pedal 24, and operation of the shift lever 20, occurs.

Figure 7:
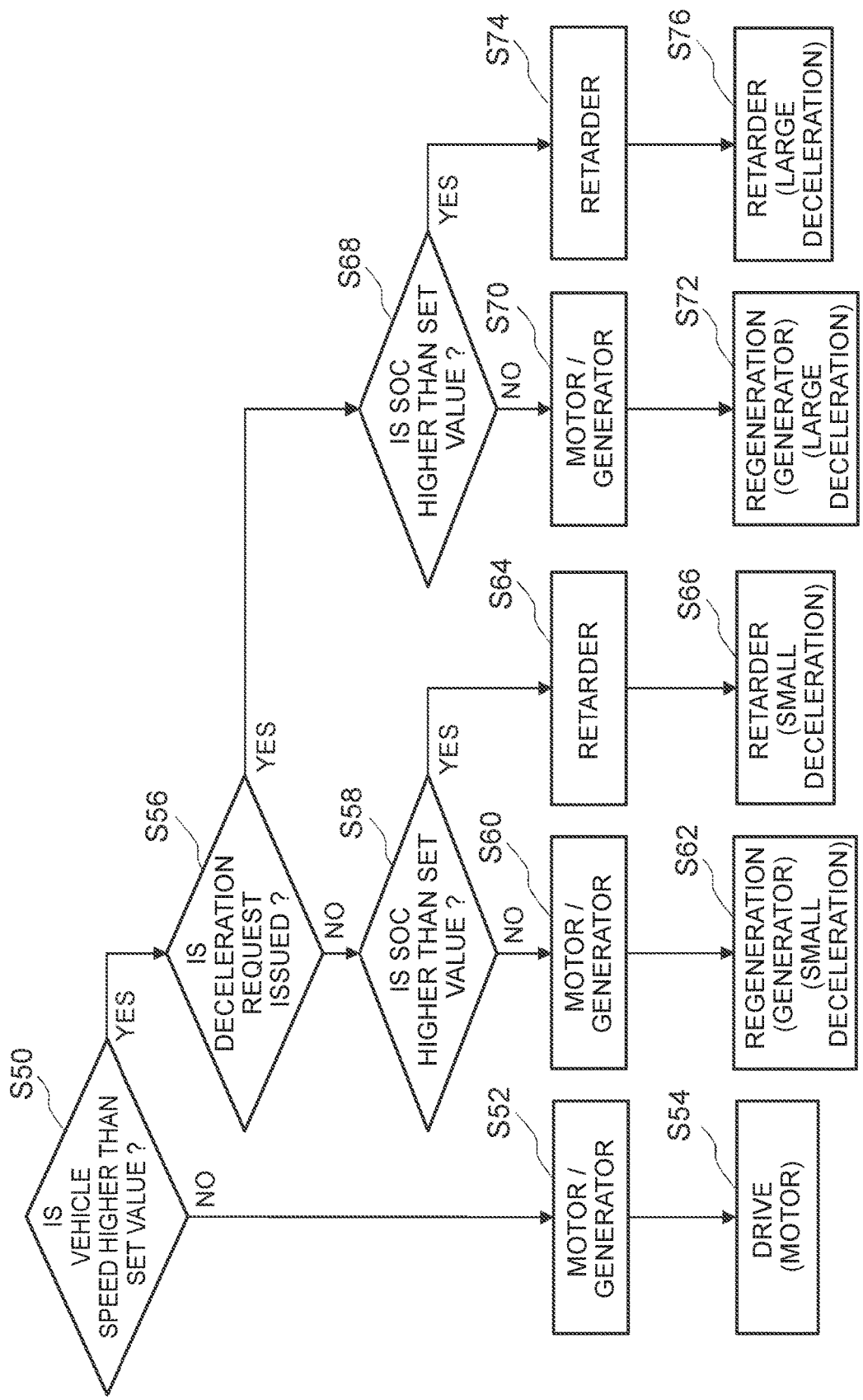
FIG. 7 is a flowchart showing another example of control over the retarder-equipped rotating electrical machine.

In the control shown in FIG. 7, when the vehicle speed of the vehicle 10 is higher than the set vehicle speed value B and the SOC is lower than or equal to the set SOC value, the retarder-equipped rotating electrical machine 28 is used as a motor or a generator. Then, when a deceleration request is issued, the vehicle 10 is decelerated by immediately performing regeneration with the generator. In addition, it is possible to improve electric power efficiency through regenerative charging.

On the other hand, when the vehicle speed of the vehicle 10 is higher than the set vehicle speed value B and the SOC is higher than the set SOC value, the retarder-equipped rotating electrical machine 28 is definitely used as a retarder. Thus, running at a speed higher than the set vehicle speed value B is prevented, and, when a deceleration request is issued, it is possible to immediately operate the retarder. Therefore, it is possible to prevent a decrease in deceleration due to the fact that regenerative charging cannot be performed.

(5) Other Configuration Examples

Other configuration examples different from that of the retarder-equipped rotating electrical machine 28 shown in FIG. 3 will be described with reference to FIG. 8 to FIG. 11. FIG. 8 to FIG. 11 each are views corresponding to FIG. 3. Like reference signs are assigned to the same or similar components, and the description thereof is omitted or simplified.

Figure 8:
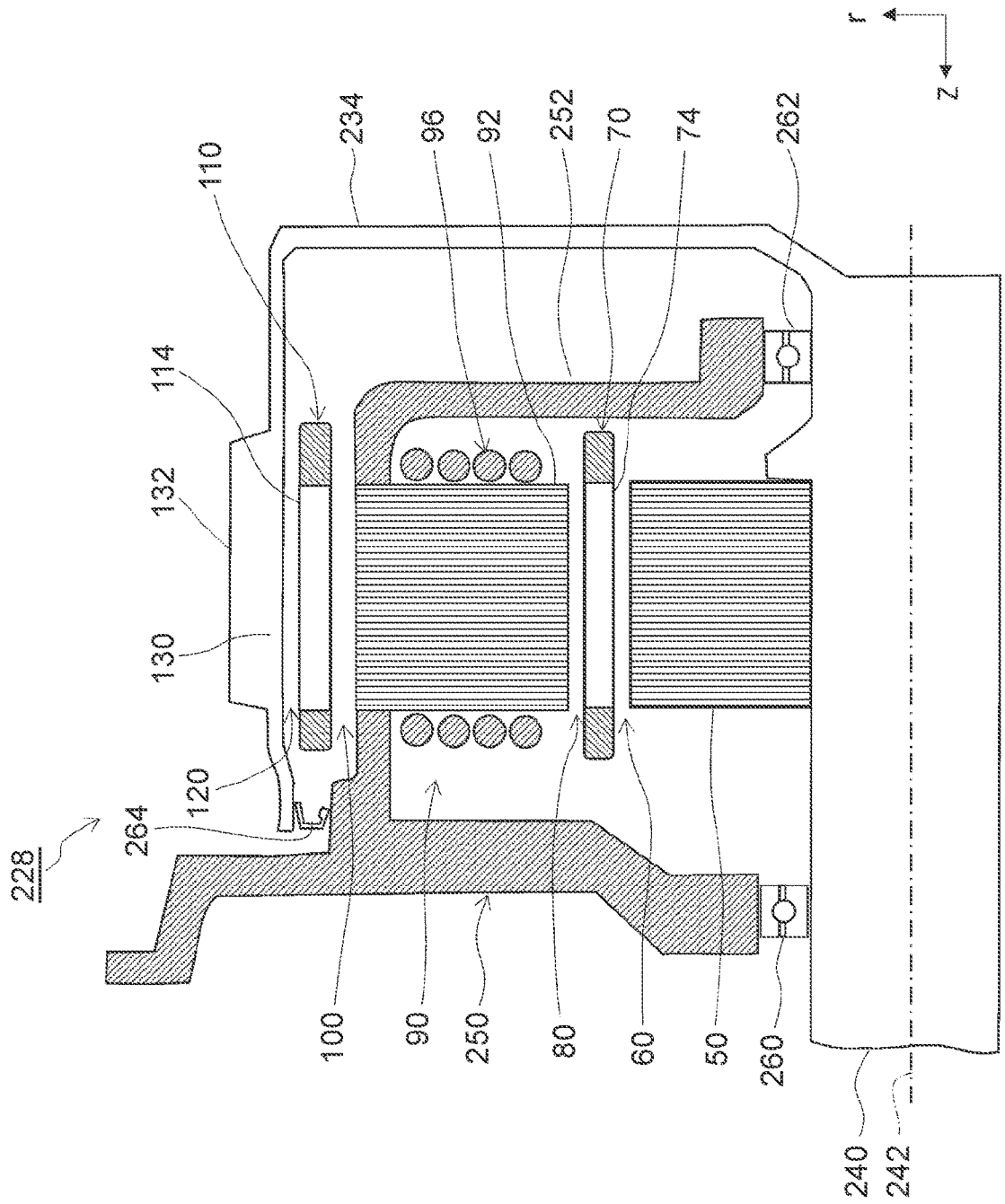
FIG. 8 is a view showing another configuration example of a retarder-equipped rotating electrical machine.

A retarder-equipped rotating electrical machine 228 shown in FIG. 8 includes a shaft 240 having a rotation axis 242. The shaft 240 may be solid inside or may be hollow inside. The shaft 240 is assumed to extend to a positive side in the z coordinate direction. The rotor 50 is fixed to the shaft 240. The pole pieces 74 of the rotor-to-stator pole piece portion 70 are provided on the outer side of the rotor 50 across the gap 60.

The stator 90 is provided on the outer side of the rotor-to-stator pole piece portion 70 across the gap 80. The pole pieces 114 of the stator-to-retarder rotor pole piece portion 110 are provided on the outer side of the stator 90 across the gap 100. The rotor-to-stator pole piece portion 70 and the stator-to-retarder rotor pole piece portion 110 are connected by a portion (not shown) and are able to be integrally turned around the rotation axis. The retarder rotor 130 is provided on the outer side of the stator-to-retarder rotor pole piece portion 110.

These structures are basically similar to those of the retarder-equipped rotating electrical machine 28 shown in FIG. 3 and also correspond to the structures shown in FIG. 2. In other words, the retarder-equipped rotating electrical machine 228 has such a structure that the shaft 240, the rotor 50, the rotor-to-stator pole piece portion 70, the stator 90, the stator-to-retarder rotor pole piece portion 110, and the retarder rotor 130 are provided coaxially with the rotation axis 242 from the inner side toward the outer side.

The structure that the retarder rotor 130 is fixed to the shaft 240 via an arm 234 is also similar to that of the retarder-equipped rotating electrical machine 28 shown in FIG. 3. However, the arm 234 is provided at the negative side in the z coordinate direction, and a portion of a case 250, exposed to the outside in FIG. 8, is provided at the positive side in the z coordinate direction.

In the retarder-equipped rotating electrical machine 228, the case 250 supports an area around an end of the retarder rotor 130 via an oil seal 264. The case 250 has an arm 252 that extends toward the stator 90 and then extends toward the shaft 240 inside the retarder-equipped rotating electrical machine 228. The arm 252 supports the stator 90 and supports the outer periphery of the shaft 240 via a bearing 262 such that the shaft 240 is rotatable. At the other end of the case 250, the outer periphery of the shaft 240 is supported via a bearing 260 such that the shaft 240 is rotatable.

In this way, in the retarder-equipped rotating electrical machine 228 shown in FIG. 8, the shapes and manner of support of the shaft 240 and the case 150 are significantly different from those of the retarder-equipped rotating electrical machine 28 shown in FIG. 3. However, the relation among the rotor 50, the rotor-to-stator pole piece portion 70, the stator 90, the stator-to-retarder rotor pole piece portion 110, and the retarder rotor 130 is basically not changed. Therefore, the retarder-equipped rotating electrical machine 228 is capable of operating as a motor, a generator, and a retarder.

Figure 9:
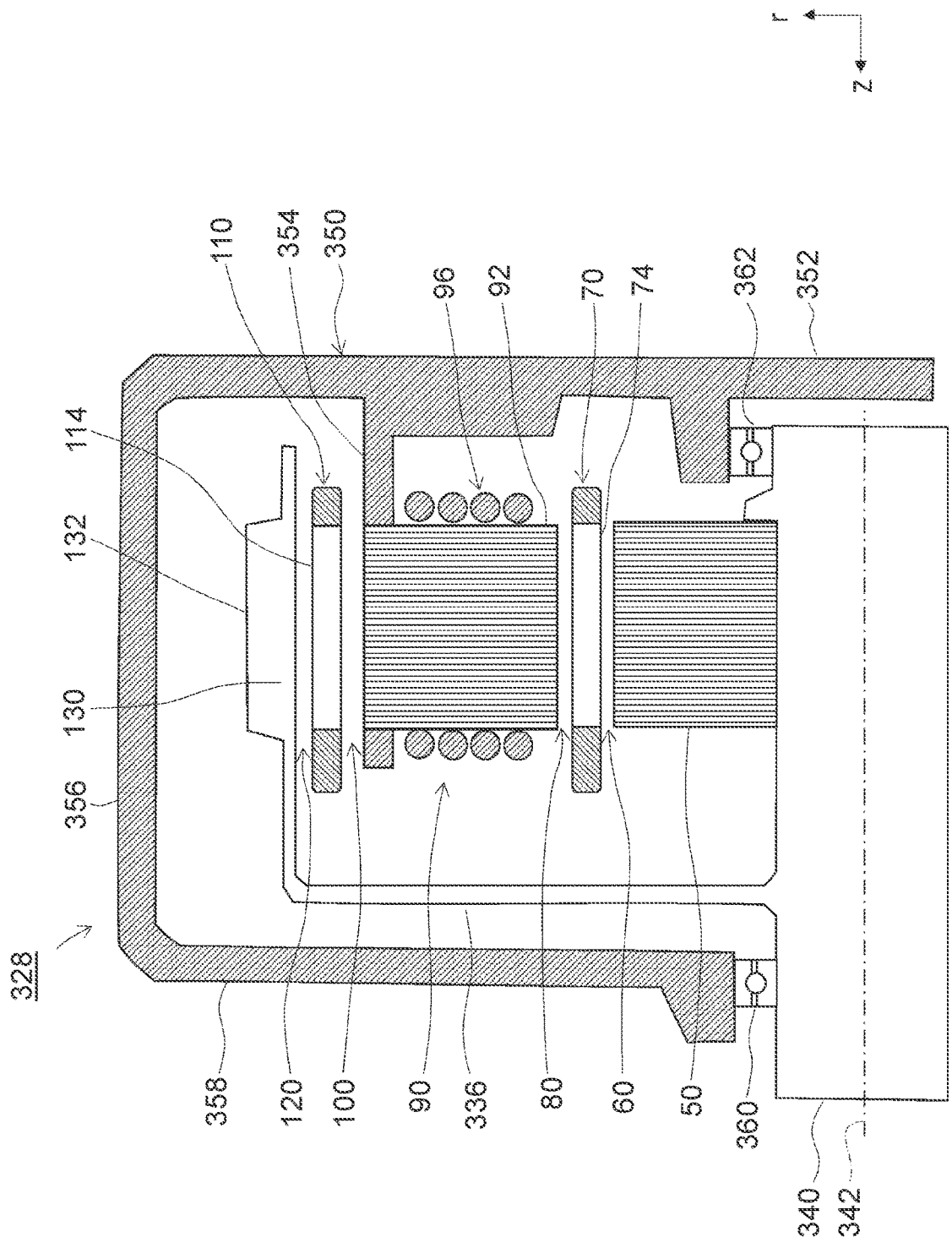
FIG. 9 is a view showing further another configuration example of a retarder-equipped rotating electrical machine.

A retarder-equipped rotating electrical machine 328 shown in FIG. 9 includes a shaft 340 that has a rotation axis 342 and that is solid or hollow inside. The shaft 340 is assumed to extend to a positive side in the z coordinate direction. The retarder-equipped rotating electrical machine 328 has such a structure that the rotor 50, the rotor-to-stator pole piece portion 70, the stator 90, the stator-to-retarder rotor pole piece portion 110, and the retarder rotor 130 are provided on the outer side of the shaft 340 sequentially from the inner side. The structure is similar to that of the retarder-equipped rotating electrical machine 28 shown in FIG. 3. The structure that the retarder rotor 130 is fixed to the shaft 340 via an arm 336 is also similar to that of the retarder-equipped rotating electrical machine 28 shown in FIG. 3.

In the retarder-equipped rotating electrical machine 328 shown in FIG. 9, all the components are covered with a case 350. The case 350 has a portion 352 that covers an end portion side (negative side in the z coordinate direction) of the shaft 340, a portion 356 that covers the outer side of the retarder rotor 130, and a portion 358 that covers a positive side in the z coordinate direction relative to the arm 336 of the retarder rotor 130. The case 350 supports an area around the outer periphery of the end portion of the shaft 340 via a bearing 362 on the inner side of the portion 352 such that the shaft 340 is rotatable. The case 350 also supports the outer periphery of the shaft 340 on the positive side in the z coordinate direction relative to the arm 336 via a bearing 360 at the distal end of the portion 358 such that the shaft 340 is rotatable. The case 350 fixes the stator 90 with the portion 354 extending from the portion 352 toward the stator 90.

In the retarder-equipped rotating electrical machine 328 shown in FIG. 9, the shapes and manner of support of the shaft 340 and the case 350 are significantly different from those of the retarder-equipped rotating electrical machine 28 shown in FIG. 3. However, the relation among the rotor 50, the rotor-to-stator pole piece portion 70, the stator 90, the stator-to-retarder rotor pole piece portion 110, and the retarder rotor 130 is basically not changed. Therefore, the retarder-equipped rotating electrical machine 328 is capable of operating as a motor, a generator, and a retarder.

Each of the retarder-equipped rotating electrical machines 28, 228, 328 has a structure called radial gap type. In other words, the stator is provided on the outer side of the rotor across a gap. The retarder rotor is also disposed in a radial gap type coaxially with the stator on the outer side. In contrast, a retarder-equipped rotating electrical machine that will be described below has a structure called axial gap type. In other words, a rotor and a stator are disposed next to each other in the rotation axis direction across a gap.

Figure 10:
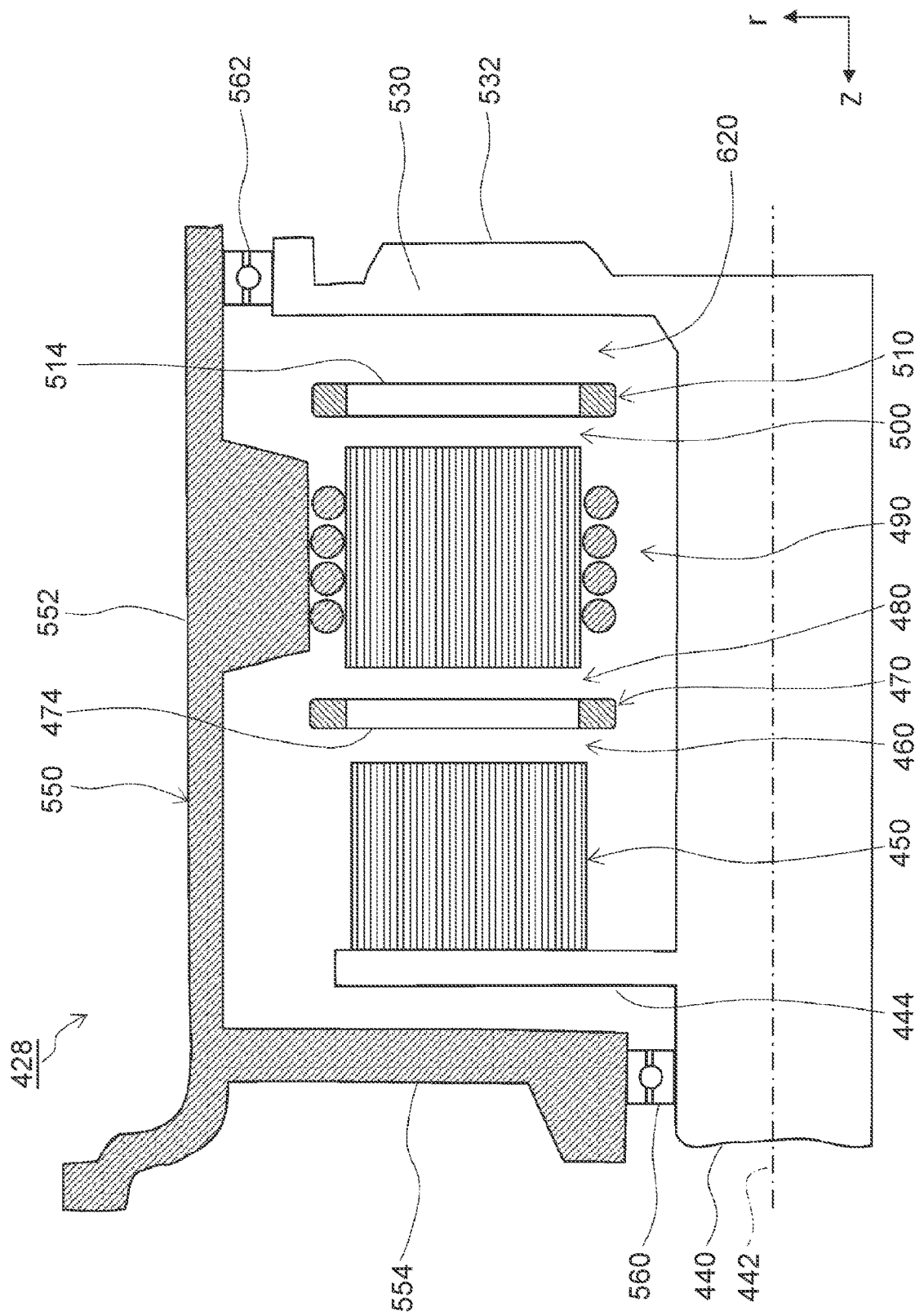
FIG. 10 is a view showing a configuration example of an axial gap-type retarder-equipped rotating electrical machine.

In a retarder-equipped rotating electrical machine 428 shown in FIG. 10, a shaft 440 is installed along a rotation axis 442. The shaft 440 has a supporting portion 444 extending in the r coordinate direction. A rotor 450 is fixed to the supporting portion 444. The rotor 450 has a cylindrical shape and is installed coaxially with the rotation axis 442. A cylindrical rotor-to-stator pole piece portion 470 is provided on the negative side of the rotor 450 in the z coordinate direction across a gap 460 coaxially with the rotation axis 442. The rotor-to-stator pole piece portion 470 includes pole pieces 474 disposed at regular intervals in the circumferential direction. A stator 490 is provided on the negative side of the rotor-to-stator pole piece portion 470 in the z coordinate direction across a gap 480. The stator 490 is formed in a cylindrical shape and disposed coaxially with the rotation axis 442. Teeth (not shown) are disposed in the stator 490 at regular intervals in the circumferential direction. The teeth extend from one end to the other end in the z direction in the stator 490 and are capable of passing magnetic fluxes from one end to the other end.

A cylindrical stator-to-retarder rotor pole piece portion 510 is provided on the negative side of the stator 490 in the z coordinate direction across a gap 500 coaxially with the rotation axis 442. The stator-to-retarder rotor pole piece portion 510 includes pole pieces 514 disposed at regular intervals in the circumferential direction. The stator-to-retarder rotor pole piece portion 510 is connected to the rotor-to-stator pole piece portion 470 at a location (not shown).

A cylindrical retarder rotor 530 is provided on the negative side of the stator-to-retarder rotor pole piece portion 510 in the z coordinate direction across a gap 620. The retarder rotor 530 is provided with fins 532 on the negative side in the z coordinate direction. The retarder rotor 530 is fixed to the outer surface of the shaft 440.

The case 550 has a portion 552 provided at the positive side in the r coordinate direction and a portion 554 provided at the positive side in the z coordinate direction. The portion 552 supports the stator 490. The negative side of the portion 552 in the z coordinate direction supports a positive-side end portion of the retarder rotor 530 in the r coordinate direction via a bearing 562 such that the retarder rotor 530 is rotatable. The portion 554 supports the outer periphery of the shaft 440 via a bearing 560 such that the shaft 440 is rotatable.

Although not shown in FIG. 10, the movement mechanism 140 described with reference to FIG. 2 is installed. Then, it is possible to operate the retarder-equipped rotating electrical machine 428 as a motor and a generator by moving the rotor-to-stator pole piece portion 470 and the stator-to-retarder rotor pole piece portion 510 to the first position, and it is possible to operate the retarder-equipped rotating electrical machine 428 as a retarder by moving the rotor-to-stator pole piece portion 470 and the stator-to-retarder rotor pole piece portion 510 to the second position.

Figure 11:
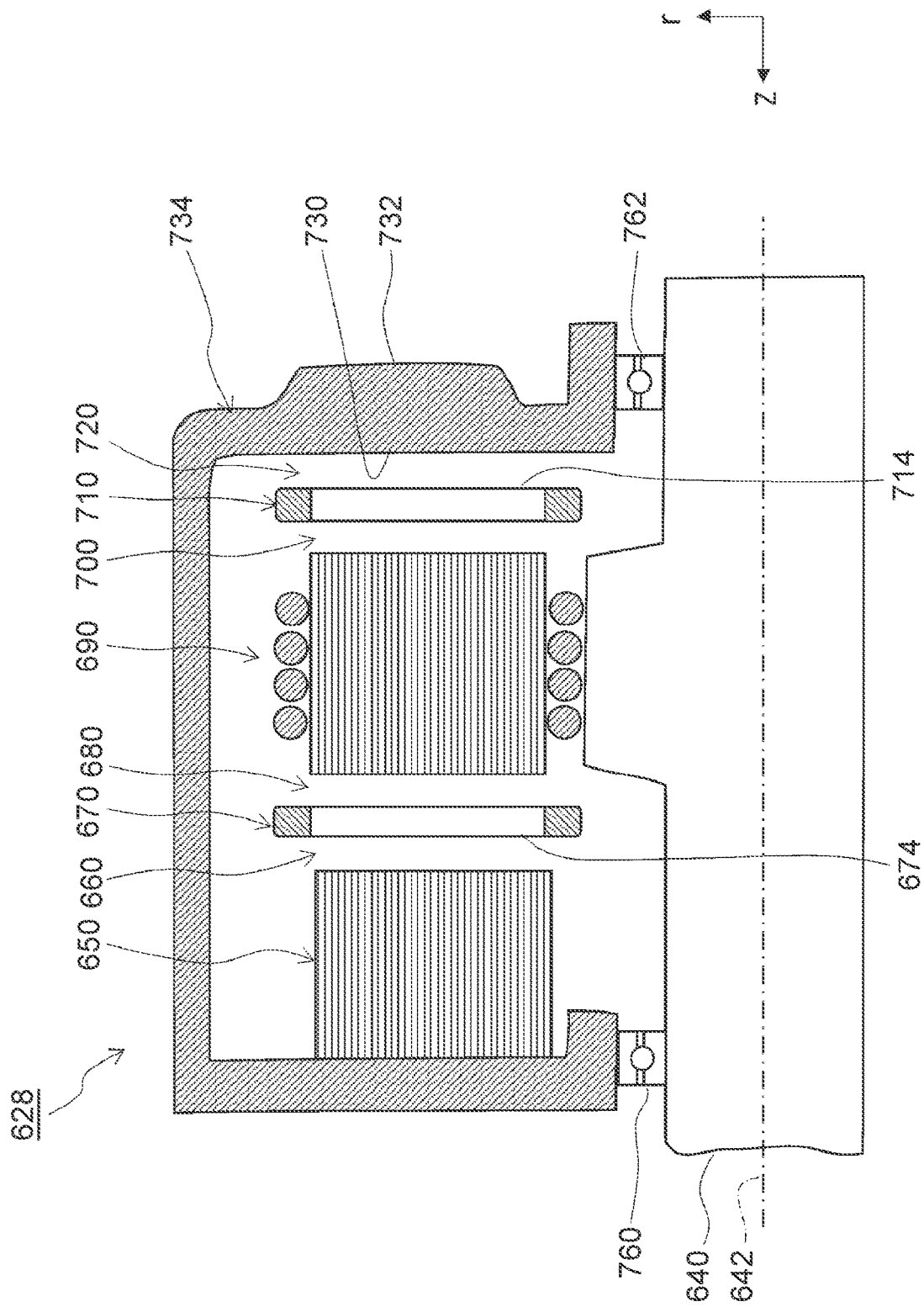
FIG. 11 is a view showing another configuration example of an axial gap-type retarder-equipped rotating electrical machine.

In a retarder-equipped rotating electrical machine 628 shown in FIG. 11, a support pole 640 is installed along a rotation axis 642. A stator 690 is fixed to the support pole 640. A rotating frame 734 including a retarder rotor 730 and fins 732 is supported by the support pole 640 via a bearing 760 and a bearing 762 so as to be rotatable around the support pole 640.

The shapes of a rotor 650, a rotor-to-stator pole piece portion 670, the stator 690, a stator-to-retarder rotor pole piece portion 710, and the retarder rotor 730 provided in the retarder-equipped rotating electrical machine 628 and their position relation are basically similar to those of the retarder-equipped rotating electrical machine 428 shown in FIG. 10. However, in the retarder-equipped rotating electrical machine 628 shown in FIG. 11, the rotor 650 is connected to the rotating frame 734 and rotates integrally with the retarder rotor 730. The stator 690 is fixed to the support pole 640. The rotor-to-stator pole piece portion 670 and the stator-to-retarder rotor pole piece portion 710 are connected to the support pole 640, and are configured to be movable between the first position and the second position by using a movement mechanism (not shown).

In the retarder-equipped rotating electrical machine 628, the rotating frame 734 is connected to the drive shaft 30 of the vehicle 10 such that torque can be transmitted. The retarder-equipped rotating electrical machine 628, as well as the retarder-equipped rotating electrical machine 428 shown in FIG. 10, is capable of operating as a motor, a generator, and a retarder.

The axial gap-type retarder-equipped rotating electrical machines 428, 628, as well as the radial gap-type retarder-equipped rotating electrical machines, are capable of operating as a motor, a generator, and a retarder. In the description, some embodiments are illustrated; however, other various embodiments are possible.

What is claimed is:

1. A retarder-equipped rotating electrical machine comprising:
    a rotor having magnetic poles at regular intervals in a circumferential direction and configured to rotate in the circumferential direction;
    a stator having teeth on which a coil is wound and having the teeth at regular intervals in the circumferential direction, one ends of the teeth being disposed so as to face the rotor;
    a retarder rotor having a magnetic member continuously in the circumferential direction, the magnetic member being disposed so as to face the other ends of the teeth of the stator, the retarder rotor being configured to rotate integrally with the rotor;
    a rotor-to-stator pole piece portion having pole pieces at regular intervals in the circumferential direction and disposed between the rotor and the stator;
    a stator-to-retarder rotor pole piece portion having pole pieces at regular intervals in the circumferential direction and disposed between the stator and the retarder rotor; and
    a movement mechanism configured to control a flow of magnetic flux in and out of the teeth by moving the rotor-to-stator pole piece portion and the stator-to-retarder rotor pole piece portion in the circumferential direction, the movement mechanism being configured to change the rotor-to-stator pole piece portion and the stator-to-retarder rotor pole piece portion between a first position for a motor or a generator to cause an interaction due to the magnetic flux between the stator and the rotor and a second position for a retarder to cause an interaction due to the magnetic flux between the stator and the retarder rotor.

2. The retarder-equipped rotating electrical machine according to claim 1, wherein:
    the retarder-equipped rotating electrical machine is connected to a drive shaft of a vehicle;
    the movement mechanism is configured to, when a vehicle speed of the vehicle is less than a set vehicle speed value, place the rotor-to-stator pole piece portion and the stator-to-retarder rotor pole piece portion in the first position; and
    the movement mechanism is configured to, when the vehicle speed of the vehicle is greater than or equal to the set vehicle speed value, place the rotor-to-stator pole piece portion and the stator-to-retarder rotor pole piece portion in the second position.

3. The retarder-equipped rotating electrical machine according to claim 1, wherein:
    the retarder-equipped rotating electrical machine is connected to a battery configured to perform power supply and regenerative charging with the retarder-equipped rotating electrical machine;
    the movement mechanism is configured to, when an SOC of the battery is less than a set SOC value, place the rotor-to-stator pole piece portion and the stator-to-retarder rotor pole piece portion in the first position; and
    the movement mechanism is configured to, when the SOC of the battery is greater than or equal to the set SOC value, place the rotor-to-stator pole piece portion and the stator-to-retarder rotor pole piece portion in the second position.

* * * * *